US011167782B1

(12) United States Patent
MacKarvich

(10) Patent No.: US 11,167,782 B1
(45) Date of Patent: Nov. 9, 2021

(54) FALL ARREST CART

(71) Applicant: Charles J. MacKarvich, Atlanta, GA (US)

(72) Inventor: Charles J. MacKarvich, Atlanta, GA (US)

(*) Notice: Subject to any disclaimer, the term of this patent is extended or adjusted under 35 U.S.C. 154(b) by 0 days.

(21) Appl. No.: 17/138,316

(22) Filed: Dec. 30, 2020

(51) Int. Cl.
*B62B 3/00* (2006.01)
*B62B 5/04* (2006.01)
*A62B 35/00* (2006.01)

(52) U.S. Cl.
CPC .......... *B62B 5/049* (2013.01); *A62B 35/0068* (2013.01); *B62B 3/003* (2013.01)

(58) Field of Classification Search
CPC ......... B62B 5/049; B62B 5/04; B62B 5/0495; B62B 5/0438; B62B 3/00; B62B 3/003; B62B 3/002; B62B 3/04; B62B 3/02; A62B 35/0068; A62B 35/0043; A62B 35/0075; A62B 35/0093; A62B 35/00; E04G 21/32; E04G 21/3276; E04G 21/3223; E04G 21/3204; E04G 21/3242; E04G 21/3233; E04G 21/3238; E04G 21/328; E04G 21/3214
See application file for complete search history.

(56) References Cited

U.S. PATENT DOCUMENTS

| | | | |
|---|---|---|---|
| 4,274,507 A | 6/1981 | Williams | |
| 4,496,027 A | 1/1985 | Fisher | |
| 4,607,724 A | 8/1986 | Hillberg | |
| 4,817,758 A | 4/1989 | Gilmore | |
| 5,004,072 A | 4/1991 | Launer | |
| 5,135,078 A | 8/1992 | Bell et al. | |
| 5,328,192 A | 7/1994 | Thompson | |
| 5,337,856 A | 8/1994 | Fillers | |
| 5,370,203 A | 12/1994 | Kiska | |
| 5,476,282 A | 12/1995 | Dahl | |
| 5,820,143 A | 10/1998 | Rigo | |
| 5,971,410 A * | 10/1999 | Nichols | B62B 1/18 280/47.31 |
| 6,019,330 A | 2/2000 | Affrunti | |
| 6,227,553 B1 | 5/2001 | Palmer | |
| 6,412,230 B1 | 7/2002 | Zambelli et al. | |
| 6,786,020 B2 | 9/2004 | Poldmaa | |
| 6,805,220 B2 | 10/2004 | Fulton et al. | |
| 6,880,838 B2 | 4/2005 | Hjorth | |
| 7,032,710 B2 | 4/2006 | Anderson et al. | |
| 7,207,414 B2 | 4/2007 | Luke et al. | |
| 7,537,085 B2 | 5/2009 | Veiesnik | |

(Continued)

*Primary Examiner* — James M Dolak
(74) *Attorney, Agent, or Firm* — Taylor English Duma LLP

(57) ABSTRACT

A fall arrest cart assembly includes a cart including a frame defining a front end and a rear end, the front end disposed opposite from the rear end, the frame including a first side rail and a second side rail extending between the front end and the rear end; and a penetrator assembly coupled to the cart, the penetrator assembly including an outboard penetrator including at least one outboard spike, the penetrator assembly movable about and between an extended position and a retracted position, the at least one outboard spike positioned outward from the first side rail and the second side rail in the extended position, the outboard penetrator configured to engage the at least one outboard spike with a ground surface when the cart is positioned on the ground surface with the penetrator assembly in the extended position.

14 Claims, 15 Drawing Sheets

(56) References Cited

U.S. PATENT DOCUMENTS

| | | | |
|---|---|---|---|
| 8,240,431 B2 | 8/2012 | Smith | |
| 8,312,680 B2 | 11/2012 | Krahn et al. | |
| 8,555,565 B2 * | 10/2013 | Mundle | E02D 5/80 |
| | | | 52/155 |
| 8,584,798 B2 * | 11/2013 | Stoffels | A62B 35/0068 |
| | | | 182/3 |
| 9,186,529 B2 * | 11/2015 | Correia | A62B 35/0068 |
| 9,675,824 B2 | 6/2017 | Mackarvich | |
| 10,071,268 B2 * | 9/2018 | Gaines | A62B 35/0068 |
| 10,183,185 B2 * | 1/2019 | Carroccia | A62B 35/04 |
| 10,226,650 B2 * | 3/2019 | Schroeder | A62B 35/0068 |
| 10,537,757 B2 * | 1/2020 | Dyer | A62B 35/0043 |
| 10,709,913 B2 * | 7/2020 | Dyer | E04G 21/3276 |
| 10,894,554 B1 * | 1/2021 | MacKarvich | E04G 21/3276 |
| 2007/0289811 A1 | 12/2007 | Smith | |
| 2009/0321184 A1 | 12/2009 | Hamilton | |
| 2011/0303484 A1 | 12/2011 | Stoffels et al. | |
| 2013/0264442 A1 | 10/2013 | Correia | |

\* cited by examiner

FALL ARREST CART

TECHNICAL FIELD

This disclosure relates to anchoring for fall arrest and fall restraint safety systems. More specifically, this disclosure relates to fall arrest cart assembly for fall arrest and fall restraint safety systems.

BACKGROUND

When workers are working at height or near drop-offs, labor regulations, such as those enforced by the Occupational Safety and Health Administration (OSHA), require that safety precautions be taken to protect the workers against falls. Two common fall protections are fall restraint systems and fall arrest systems ("fall protection systems" in general). Fall restraint systems are utilized to keep workers away from a potential fall hazard, such as an unprotected ledge. The workers may wear harnesses with fixed-length lanyards, which are strategically anchored to prevent the worker from approaching the ledge while still allowing the worker to move about the worksite. By "restraining" the worker from approaching the ledge, the worker is prevented from possibly falling off the ledge.

By contrast, fall arrest systems are intended to safely stop, or "arrest", a worker's freefall after the worker has already fallen over the fall hazard. The fall arrest system prevents the worker from striking a lower surface, such as the ground. The fall arrest system also absorbs the shock of the fall by decelerating the worker in a controlled manner, such as with a tear tape webbing pack or self-retracting lanyard.

Both fall arrest and fall restraint systems depend upon the presence of strong and reliable anchor points to function as intended. In existing facilities, particularly industrial facilities, anchor points may be incorporated directly into the structure itself. However, residential or commercial properties such as apartment buildings, hotels, and office buildings may be less likely to provide anchor points for aesthetic reasons. Also, during the construction of facilities, anchor points may not be easily provided. For example, during the construction of a multi-floor commercial building, the floors are frequently formed from flat slabs of poured concrete. These slabs do not provide any convenient place to attach a lanyard, without permanently damaging the floor by digging or penetrating into its surface.

Another consideration is that workers often must cover large areas during the course of their work, often in multiple directions relative to potential anchor points. For example, glaziers and other workers must install windows around the perimeter of each floor in many office buildings, hotels, or similar developments. These workers must be able to move efficiently from room to room or office to office to install these structures. While doing so, the workers' fall protection systems must be properly anchored to work by the open window frames in each location. Some portable systems rely upon weight to provide a mobile anchor point; however, these systems can be too heavy for a single worker to move by himself or herself.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a fall arrest cart assembly comprising a cart comprising a frame defining a front end and a rear end, the front end disposed opposite from the rear end, the frame comprising a first side rail and a second side rail extending between the front end and the rear end; and a penetrator assembly coupled to the cart, the penetrator assembly comprising an outboard penetrator comprising at least one outboard spike, the penetrator assembly movable about and between an extended position and a retracted position, the at least one outboard spike positioned outward from the first side rail and the second side rail in the extended position, the outboard penetrator configured to engage the at least one outboard spike with a ground surface when the cart is positioned on the ground surface with the penetrator assembly in the extended position.

Also disclosed is a fall arrest cart assembly comprising a cart comprising a frame; a load coupled to the frame, the load defining a load center of gravity, the load center of gravity positioned beneath the frame; and a penetrator assembly couples to the frame, the penetrator assembly movable about and between an extended position and a retracted position, the penetrator assembly comprising at least one spike, the penetrator assembly configured to engage the at least one spike with a ground surface when the cart is positioned on the ground surface with the penetrator assembly in the extended position.

Also disclosed is a method for using a fall arrest cart assembly, the method comprising positioning a cart of the fall arrest cart assembly on a ground surface with a penetrator assembly of the fall arrest cart assembly positioned in a retracted position, the penetrator assembly coupled to a frame of the cart, the penetrator assembly comprising at least one outboard spike and at least one inboard spike, the at least one outboard spike and the at least one inboard spike spaced apart above the ground surface in the retracted position; and exerting an outward force on the penetrator assembly to transition the penetrator assembly from the retracted position to an extended position comprising engaging the at least one inboard spike with the ground surface beneath the frame in the extended position; and engaging the at least one outboard spike with the ground surface outward from the frame in the extended position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
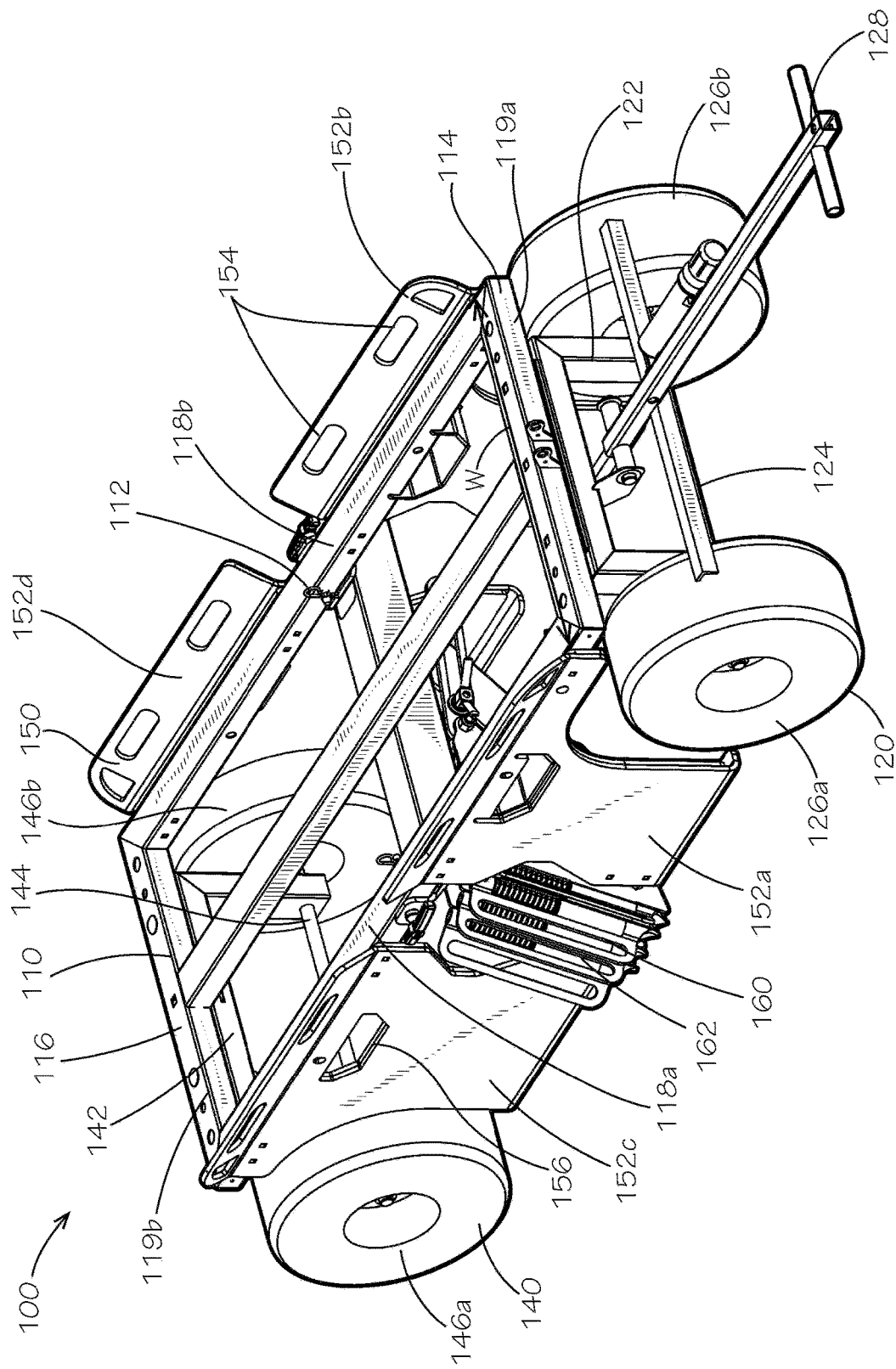
FIG. 1 is a front perspective view of a fall arrest cart assembly comprising a cart, a load, and a penetrator assembly in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a fall arrest cart assembly and associated methods, systems, devices, and various apparatus. The fall arrest cart assembly can comprise a cart, a load, and a penetrator assembly. It would be understood by one of skill in the art that the disclosed fall arrest cart assembly is described in but a few exemplary aspects among many. No particular terminology or description should be considered limiting on the disclosure or the scope of any claims issuing therefrom.

FIG. 1 is a front perspective view of a fall arrest cart assembly 100 comprising a cart 110, a load 150, and a penetrator assembly 160 in accordance with one aspect of the present disclosure. The cart 110 can comprise a frame 112, a front axle assembly 120, and a rear axle assembly 140. The frame 112 can define a front end 114 and a rear end 116 disposed opposite from the front end 114. The frame 112 can comprise a first side rail 118a and a second side rail 118b extending between the front end 114 and the rear end 116. The frame 112 can comprise a pair of cross-bars 119a,b positioned at the front end 114 and the rear end 116, and the cross-bars 119 can be coupled to each of the side rails 118a,b. The frame 112 can define a width W between the outer surfaces of the side rails 118a,b.

The front axle assembly 120 can comprise a front axle subframe 122, an axle shaft 124 (shown partially obstructed in FIG. 1 and more clearly in FIG. 2), a pair of tires 126a,b, and a steering arm 128. The front axle subframe 122 can extend downwards from the front cross-bar 119a, and the front axle subframe 122 can be rotatably coupled to the front cross-bar 119a. The axle shaft 124 can be coupled to the front axle subframe 122 opposite from the front cross-bar 119a. The pair of tires 126a,b can be coupled to opposite ends of the axle shaft 124. The steering arm 128 can be hingedly coupled to the front axle subframe 122 so that horizontal rotation of the steering arm 128 can rotate the front axle subframe 122 relative to the frame 112, thereby allowing the cart 110 to be steered with the steering arm 128.

The rear axle assembly 140 can comprise a rear axle subframe 142, an axle shaft 144, and a pair of tires 146a,b. The rear axle subframe 142 can extend downwards from the rear cross-bar 119b, and the rear axle subframe 142 can be rigidly coupled to the rear cross-bar 119b. The axle shaft 144 can be coupled to the rear axle subframe 142 opposite from the rear cross-bar 119b. The pair of tires 146a,b can be coupled to opposite ends of the axle shaft 144.

The load 150 can be secured to the frame 112 such that the load at least partially hangs below the frame 112. In the present aspect, the load 150 can be secured to the side rails 118a,b. The load 150 can form side skirts on either side of the frame 112, which at least partially enclose the sides of the cart 110 beneath the frame 112 and along the side rails 118a,b between the axle assemblies 120,140. By forming a skirt, the load 150 can prevent workers from placing their feet or other body parts under the cart 110 where they can be run over by the cart 110 or injured by the penetrator assembly 160.

The load 150 can comprise a plurality of weight plate sets 152a,b,c,d, each coupled to the frame 112. The weight plate sets 152a,b,c,d can comprise front weight plate sets 152a,b, which can be positioned immediately behind the front axle assembly 120, and rear weight plate sets 152c,d, which can be positioned immediately in front of the rear axle assembly 140. In the present aspect, an outboard penetrator 162 of the penetrator assembly 160 can be positioned between the front weight plate set 152a and the rear weight plate set 152c when the penetrator assembly 160 is in a retracted position, as shown.

As demonstrated by the front weight plate set 152b, each of the weight plate sets 152a,b,c,d can define at least one rigging slot 154. In the present aspect, the rigging slots 154 can be defined above the frame 112. The rigging slots 154 can be used for lifting the fall arrest cart assembly 100, such as with a crane for example and without limitation, which can facilitate placement of the fall arrest cart assembly 100 on elevated work sites, such as roofs, for example and without limitation. Additionally, the rigging slots 154 can be used to secure items to the frame 112 of the cart 110. For example and without limitation, raw materials, tools, or other items can be placed on the cart 110 and secured with cargo straps or other rigging, such as by being strapped down. In some aspects, a top panel (not shown) can be placed atop the frame 112 so that the cart 110 can be used similar to a wagon. In such aspects, the fall arrest cart assembly 100 can be used not just to provide fall arrest protection about a worksite, but also to help the workers move more efficiently between different locations on the worksite.

As demonstrated by the rear weight plate set 152c, the weight plate sets 152a,b,c,d can define lifting holes 156. The lifting holes 156 can be positioned below the frame 112, and the lifting holes 156 can be sized and shaped to receive the fork of a forklift, thereby facilitating lifting of the fall arrest cart assembly 100.

Figure 2:
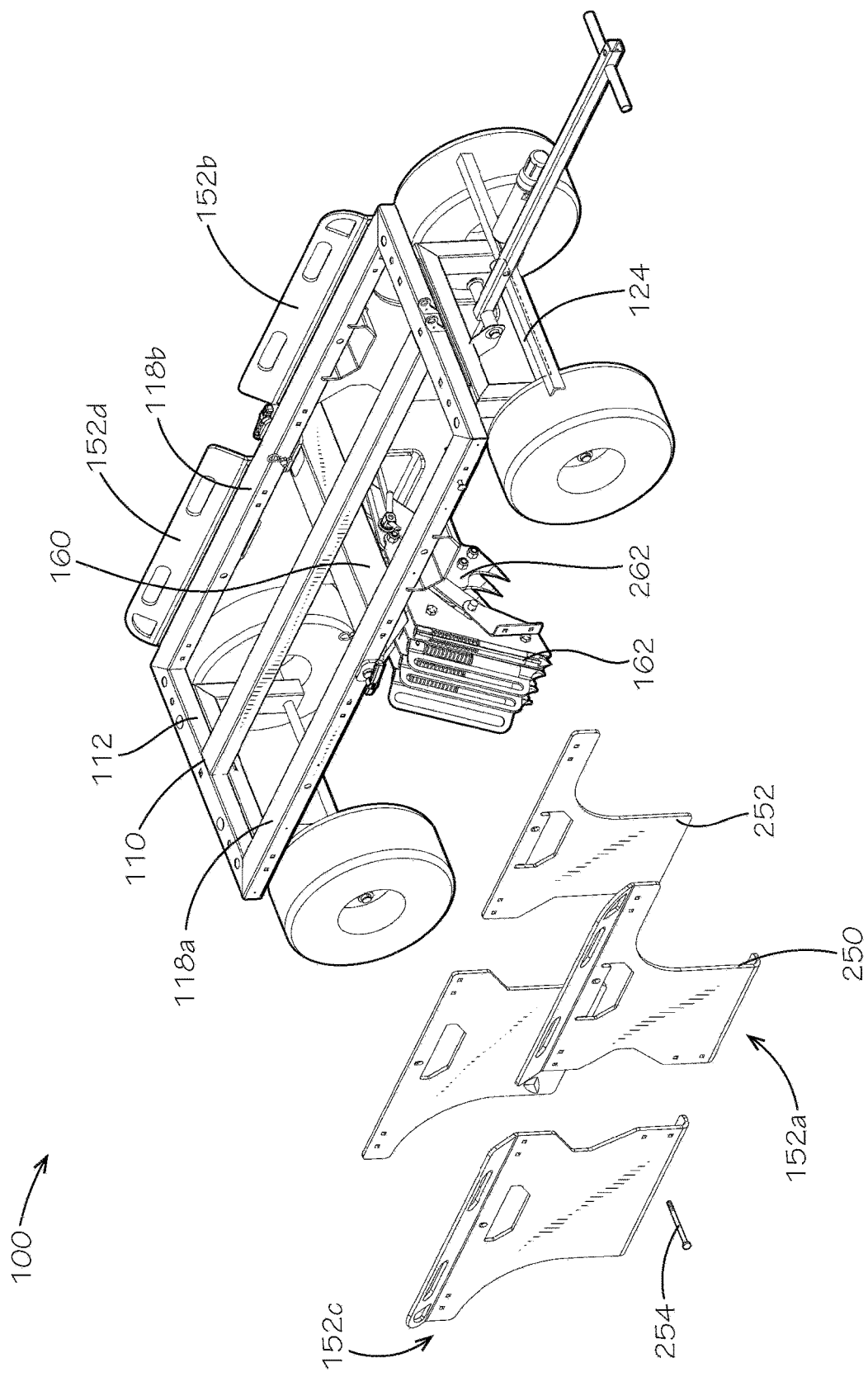
FIG. 2 is a front perspective view of the fall arrest cart assembly of FIG. 1 with two weight plate sets of the load shown in an exploded position.

FIG. 2 is a front perspective view of the fall arrest cart assembly 100 with the weight plate sets 152a,c shown in an exploded position. As demonstrated by the front weight plate set 152a, each of the weight plate sets 152a,b,c,d, can comprise a plurality of weight plates. In the present aspect, the weight plate sets 152a,b,d can each comprise an outer plate 250 and an inner plate 252, which can be secured to the side rails 118a,b of the frame 112 by fasteners 254 (only one fastener 254 shown for clarity). In some aspects, some or all of the weight plate set 152a,b,c,d can comprise a single plate. In some aspects, some or all of the weight plate set 152a,b,c,d can comprise greater than two plates. The number of plates in each weight plate set 152a,b,c,d can be adjusted to increase or decrease a weight of the fall arrest cart assembly 100. A heavier cart can generally allow more workers to safely tie off to the fall arrest cart assembly 100. As discussed below with respect to FIG. 11, the weight of the load 150 can also be adjusted to raise or lower a center of gravity of the fall arrest cart assembly 100.

With the weight plate sets 152a,c removed, the penetrator assembly 160 can be seen more clearly. In the present aspect, the penetrator assembly 160 can couple to the frame 112 of the cart 110. Specifically, the penetrator assembly 160 can couple to the side rails 118a,b of the frame 112. The penetrator assembly 160 can comprise an inboard penetrator 262 and the outboard penetrator 162. The inboard penetrator 262 can be positioned below and between the side rails 118a,b of the frame 112. The outboard penetrator 162 can extend at least partly outward from between the side rails 118a,b in the retracted position so that the first side rail 118a can be positioned between an outboard spike 464 (shown in FIG. 4) and the second side rail 118b.

Figure 3:
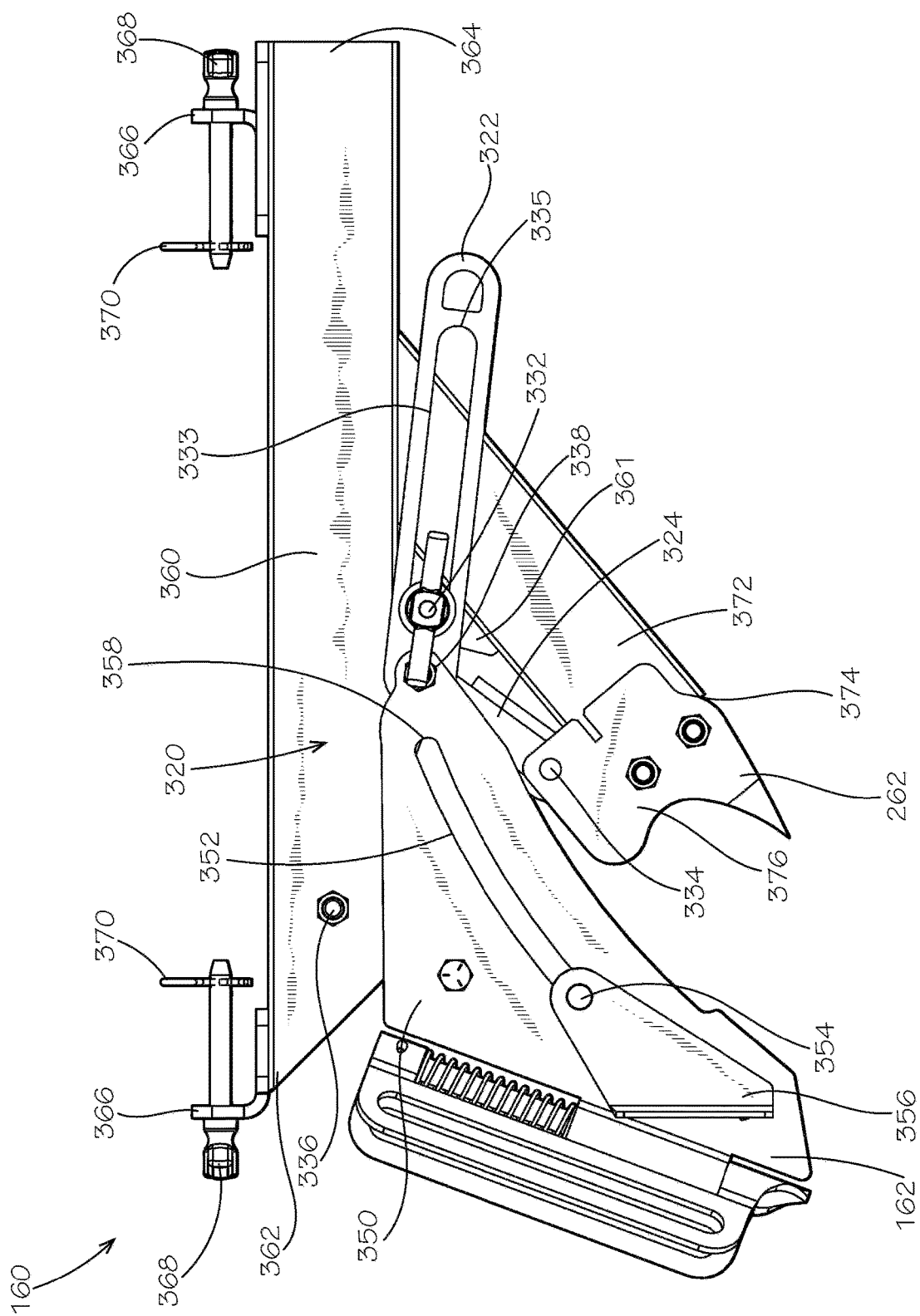
FIG. 3 is a side view of the penetrator assembly of the fall arrest cart assembly of FIG. 1 comprising an inboard penetrator and an outboard penetrator, and shown in a retracted position.

FIG. 3 is a side view of the penetrator assembly 160 of the fall arrest cart assembly 100 of FIG. 1 in the retracted position. The penetrator assembly 160 can comprise a mounting member 360 with a first end 362 and a second end 364 defined opposite from the first end 362. A mounting tab 366 can be secured to the mounting member 360 at or near each end 362,364. Each mounting tab 366 can receive a mounting pin 368, which can then be inserted through corresponding holes (not shown) of the side rails 118a,b (shown in FIG. 2) of the frame 112 (shown in FIG. 2) to secure the penetrator assembly 160 to the frame 112. Each mounting pin 368 can receive a retaining pin 370, such as a cotter pin, split pin, R-clip, or other type of pin, clip, or fastener. The retaining pins 370 can prevent inadvertent withdrawal of the mounting pins 368 from the frame 112 and the mounting tabs 366.

The penetrator assembly 160 can comprise an inboard guide 372, which can extend downwards at an angle from the mounting member 360 so that the inboard guide 372 is positioned diagonal to the mounting member 360. A gusset plate 361 can extend between the mounting member 360 and the inboard guide 372. The inboard guide 372 can define an end 374 opposite from its intersection with the mounting member 360. The inboard guide 372 can define a tubular structure, and the inboard guide 372 can receive the inboard penetrator 262. In the retracted position, an inboard penetrator head 376 of the inboard penetrator 262 can be positioned at the end 374 of the inboard guide 372.

The inboard penetrator head 376 can be coupled to a linkage 320 of the penetrator assembly 160. The linkage 320 can comprise a pair of retaining links 322, a lower link 324, and an upper link 626 (shown in FIG. 6). The retaining links 322, the lower link 324, and the upper link 626 can be pinned together by a center pin 338. Additionally, an outboard frame 350 of the outboard penetrator 162 can be hingedly coupled to the center pin 338.

The lower link 324 can be hingedly coupled to the inboard penetrator head 376 by a lower pin 334, opposite from the center pin 338. The upper link 626 can be hingedly coupled to the mounting member 360 by an upper pin 336, opposite from the center pin 338. The retaining links 322 can be coupled to the gusset 361 by a compression mechanism 332, which can engage a limiting slot 333 defined by the retaining links 322.

Figure 6:
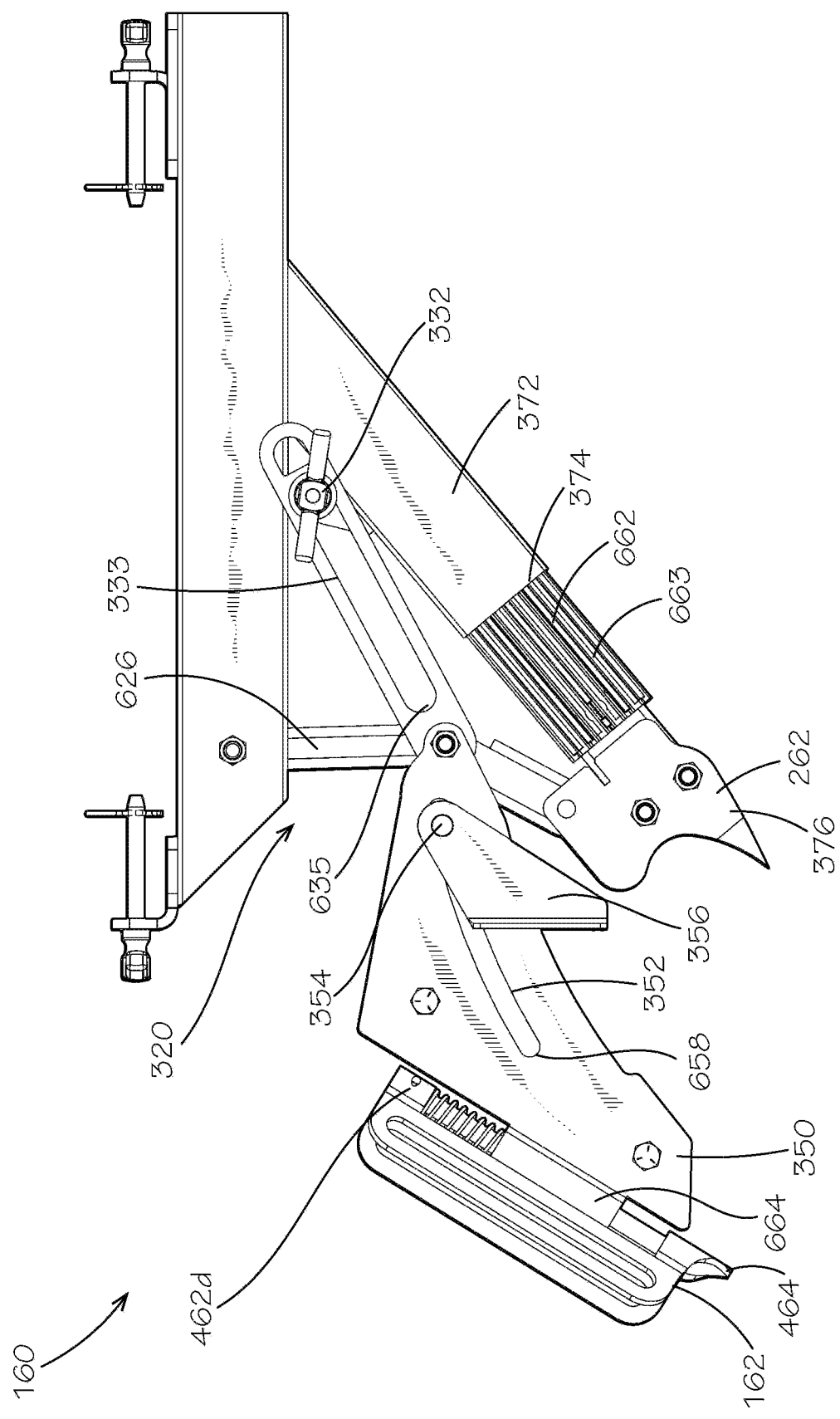
FIG. 6 is a side view of the penetrator assembly of the fall arrest cart assembly of FIG. 1 in an extended position.

The limiting slot 333 can define a first end 635 (shown in FIG. 6) and a second end 335. In the retracted position, the compression mechanism 332 can be positioned against the first end 635 as shown (though the compression mechanism 332 obscures the first end 635). When the penetrator assembly 160 is in an extended position, as shown in FIG. 6, the compression mechanism 332 can rest against the second end 335. The length of the limiting slot 333 can limit the length of travel between the retracted position and the extended position. As discussed in greater detail below with respect to FIG. 7, the compression mechanism 332 can pinch, or squeeze, the retaining links 322, thereby securing the penetrator assembly 160 in the retracted position.

The outboard frame 350 can define a guide slot 352, which can receive a guide pin 354. The guide pin 354 can couple the outboard frame 350 of the outboard penetrator 162 to a pair of guide brackets 356. The guide brackets 356 can be fastened to the weight plate sets 152a,c (shown in FIG. 1) when the penetrator assembly 160 is mounted to the cart 110 (shown in FIG. 1). The linkage 320 can synchronize travel of the inboard penetrator 262 and the outboard frame 350 of the outboard penetrator 162. As the penetrator assembly 160 extends from the retracted position to the extended position, engagement between the guide pin 354 and the guide slot 352 can control the travel of the outboard penetrator 162. The guide slot 352 can define a first end 658 (shown in FIG. 6) and a second end 358. In the retracted position, the guide pin 354 can be positioned at the first end 658 as shown (though the guide bracket 356 obscures the first end 658). When the penetrator assembly is in the extended configuration, the guide pin 354 can be positioned at the second end 358.

Figure 4:
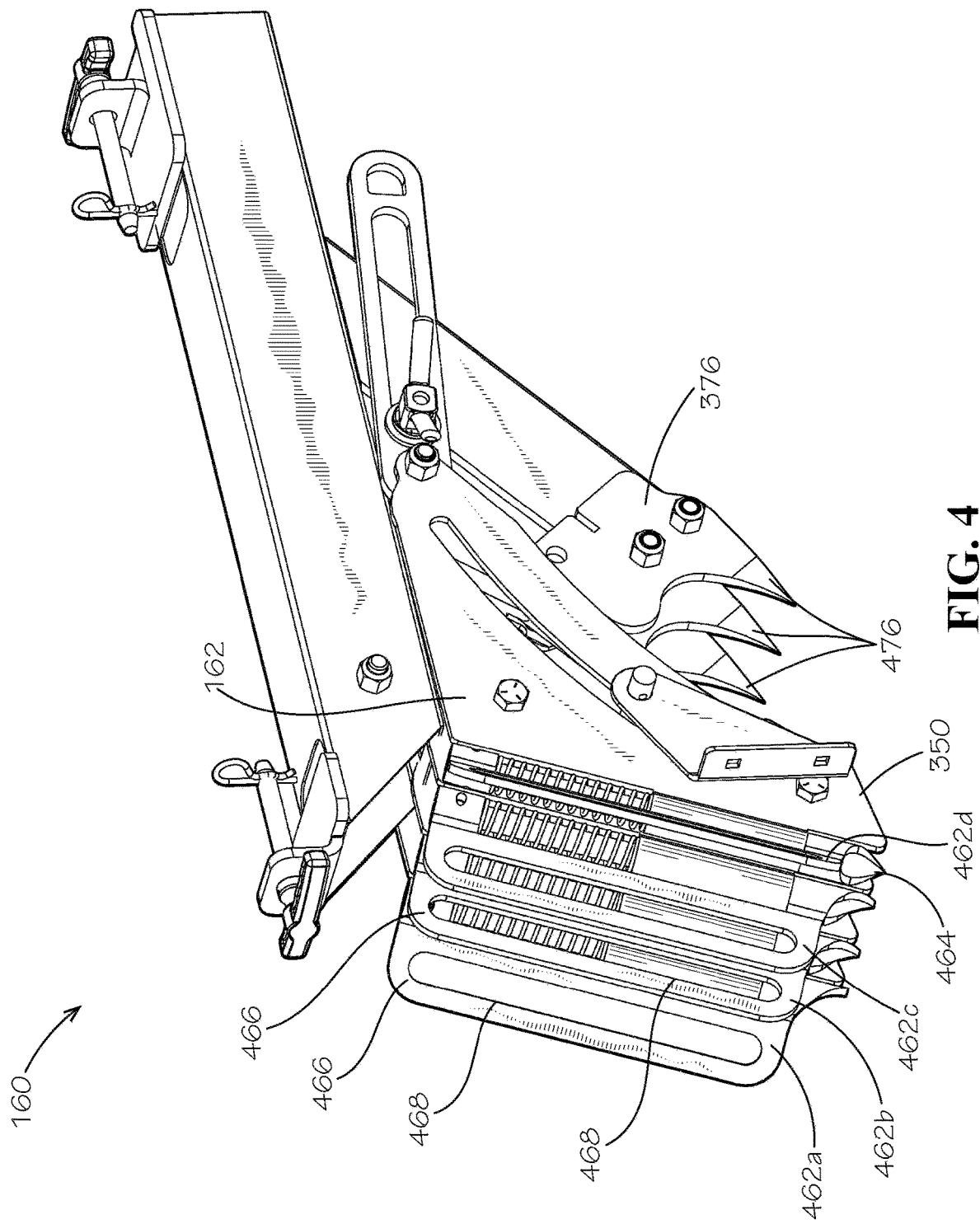
FIG. 4 is a perspective front view of the penetrator assembly of the fall arrest cart assembly of FIG. 1 in the retracted position.

FIG. 4 is a perspective front view of the penetrator assembly 160 of the fall arrest cart assembly 100 of FIG. 1 in the retracted position. The inboard penetrator head 376 can comprise at least one inboard spike 476. In the present aspect, the inboard penetrator head 376 can comprise three inboard spikes 476; however, the inboard penetrator head 376 can comprise greater or fewer than three inboard spikes 476 as desired. As shown and described in greater detail below with respect to FIGS. 8-11, the at least one inboard spike 476 can stab, or dig, into a ground surface 800 (shown in FIG. 8) to prevent the fall arrest cart assembly 100 (shown in FIG. 1) from sliding sideways when subjected to an outward force. In the present aspect, the inboard spikes 476 can be fixed relative to one another such that all of the inboard spikes 476 can engage the ground surface 800 together when the penetrator assembly 160 is actuated. In the present aspect, each inboard spike 476 can be cut from a sheet or plate of metal, such as steel for example and without limitation.

The outboard penetrator 162 can comprise at least one outboard spike 464 at the tip of at least one outboard spike assembly 462 of the outboard penetrator. In the present aspect, the at least one outboard spike assembly 462 can comprise four outboard spike assemblies 462a,b,c,d, each tipped with the outboard spike 464, as demonstrated by outboard spike assembly 462d. In other aspects, the outboard penetrator 162 can comprise greater or fewer than four outboard spike assemblies 462. In the present aspect, the outboard spike 464 can be tubular in nature with a scalloped cut forming the tip of the outboard spike 464. In other aspects, the outboard spikes 464 can define a different shape and/or construction.

As demonstrated by outboard spike assemblies 462a,b, each outboard spike assembly 462a,b,c,d can comprise a lanyard loop 466 defining a lanyard slot 468. The lanyard loops 466 can be rotationally fixed relative to the outboard spike 464 of each respective outboard spike assembly 462a, b,c,d, and the outboard spikes 464 and lanyard loops 466 can be rotated and translated downwards relative to the outboard frame 350.

In the present aspect, as demonstrated by outboard spike assembly 462b, the lanyard loops 466 for the center outboard spike assemblies 462b,c can be oriented so that the lanyard loops 466 are positioned substantially parallel to the outboard frame 350 and substantially perpendicular to the side rails 118a,b (shown in FIG. 1) in the retracted position. As demonstrated by outboard spike assembly 462a, the lanyard loops 466 for the outer outboard spike assemblies 462a,d can angle outward relative to the lanyard loops 466 of the center outboard spike assemblies 462b,c and the outboard frame 350. In the present aspect, the lanyard loops 466 of the outer outboard spike assemblies 462a,d, can be positioned at approximately a 45-degree angle to the side rails 118a,b and the outboard frame 350 in the retracted position.

Figure 5:
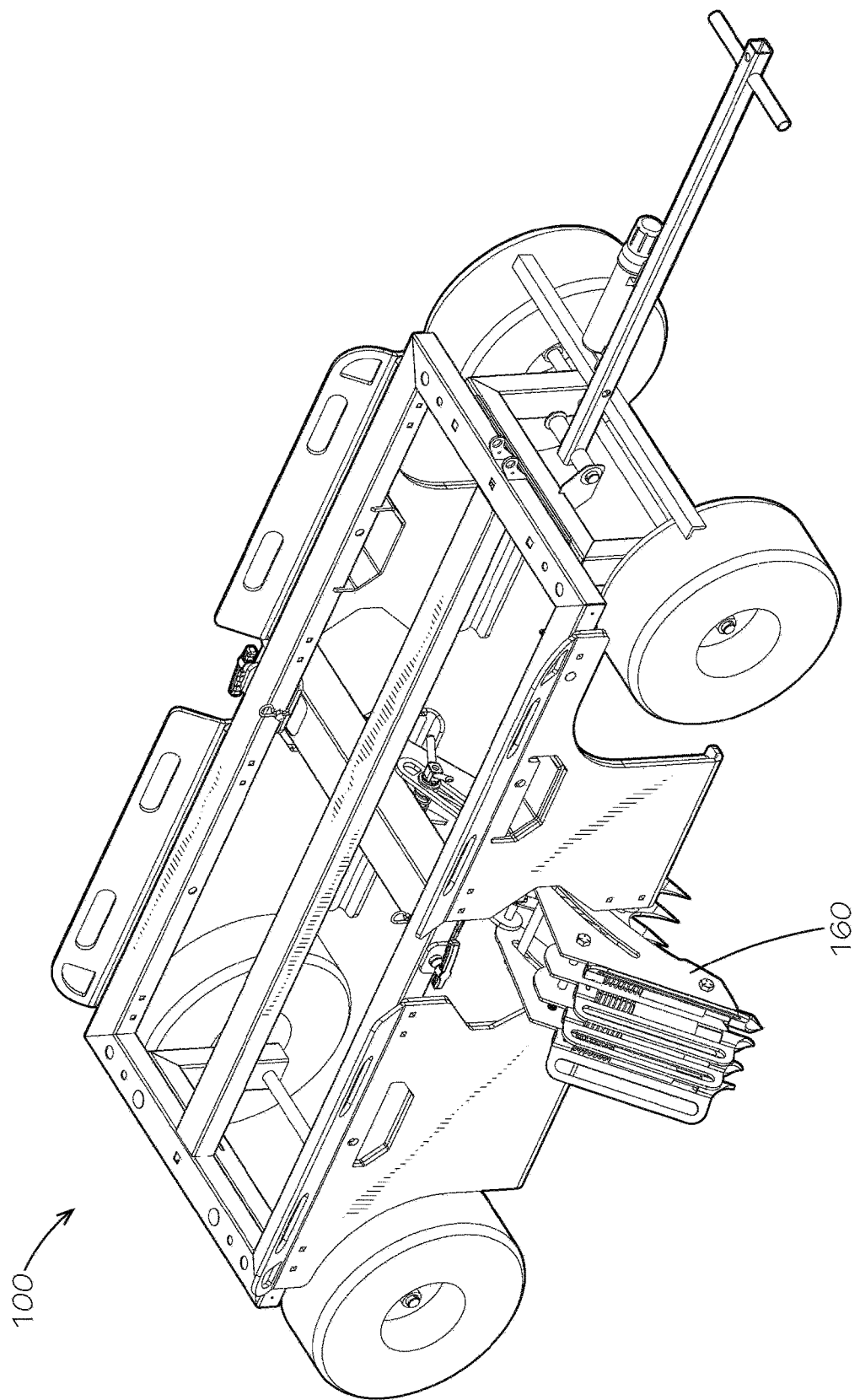
FIG. 5 is a front perspective view of the fall arrest cart assembly of FIG. 1 with the penetrator assembly shown in an extended configuration.

FIG. 5 is a front perspective view of the fall arrest cart assembly 100 of FIG. 1 with the penetrator assembly 160 shown in the extended position.

FIG. 6 is a side view of the penetrator assembly 160 of the fall arrest cart assembly 100 of FIG. 1 in the extended position. Looking forward, the steps of transitioning the penetrator assembly 160 from the retracted position to the extended position are described below with respect to FIGS. 8-11.

As shown in FIG. 6, the inboard penetrator 262 can further comprise an inboard penetrator shaft 662, which can be received by the inboard guide 372. The inboard penetrator head 376 can be mounted to the inboard penetrator shaft 662, which can telescope relative to the inboard guide 372. The inboard penetrator shaft 662 can be clad with a bearing 663, which can prevent binding between the inboard guide 372 and the inboard penetrator shaft 662. The bearing 663 can comprise a material selected for its lubricity, such as polytetrafluoroethylene or high-density polyethylene, for example and without limitation, its hardness, such as bronze, for example and without limitation, or a preferred combination of these properties.

In the extended position, the inboard penetrator head 376 can be telescoped outward from the end 374 of the inboard guide 372 as far as the linkage 320 will permit. As noted above, travel of linkage 320 can be limited by contact between the compression mechanism 332 and the second end 335 (shown in FIG. 3) of the limiting slot 333. Travel of the outboard penetrator 162 can be limited both by the linkage 320 and through contact of the guide pin 354 with the second end 358 (shown in FIG. 3) of the guide slot 352. Additionally, the position of the outboard penetrator 162 can be controlled through cooperation between the linkage 320 and engagement between the guide pin 354, the guide brackets 356, and the guide slot 352 of the outboard frame 350.

Additionally, as demonstrated by outboard spike assembly 462d, the outboard spike assemblies 462a,b,c,d (shown in FIG. 4) can translate relative to the outboard frame 350. The outboard spike assemblies 462a,b,c,d can comprise a spike guide 664, which can be rigidly fixed to the outboard frame 350 of the outboard penetrator 162. The individual outboard spikes 464 of the outboard spike assemblies 462a,b,c,d can be rotatable and translatable relative to the spike guide 664. In the extended position, at least one of the outboard spikes 464 of the outboard spike assemblies 462a,b,c,d can be translated downwards relative to the outboard frame 350 and the respective spike guide 664.

Figure 7:
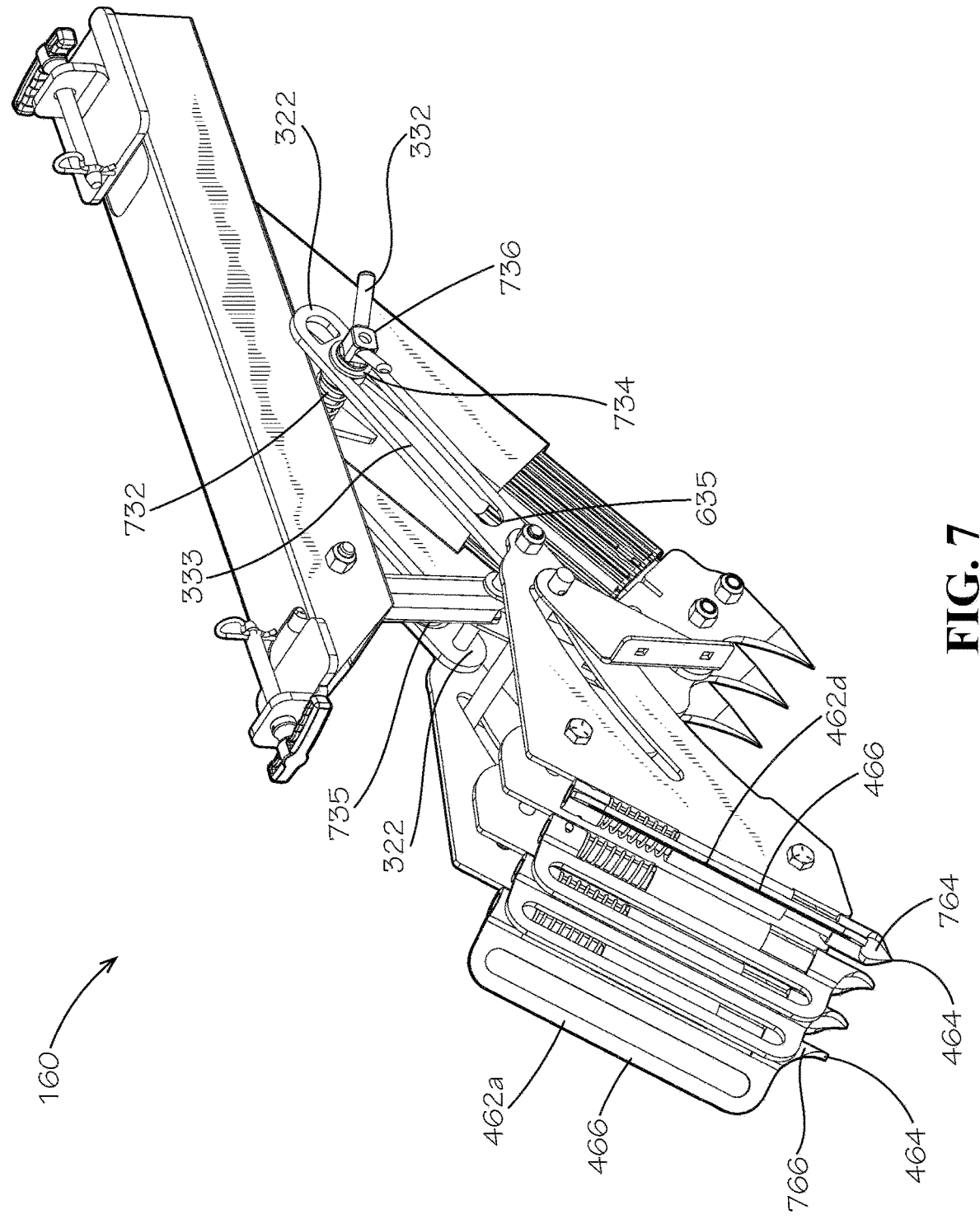
FIG. 7 is a front perspective view of the penetrator assembly of the fall arrest cart assembly of FIG. 1 in the extended position.

FIG. 7 is a perspective front view of the penetrator assembly 160 of the fall arrest cart assembly 100 of FIG. 1 in the extended position. The compression mechanism 332 can comprise a spring 732 positioned between the retaining links 322. A threaded member, such as a threaded rod or fastener, can extend through the spring 732, and at least one wing nut 736 can be threaded onto the threaded member. The wing nut 736 can be tightened or loosened to increase the compressive force of the spring 732. Washers 734 can be positioned between the at least one wing nut 736 and the retaining links 322 as well as between the spring 732 and the retaining links 322. At the first end 635 of the limiting slot 333, the retaining links 322 can each define a depression 735 on the inward facing surfaces, the outward facing surfaces, or both the inward facing surfaces and the outward facing surfaces.

When the penetrator assembly 160 is in the retracted position, one or more of the washers 734 can engage the depressions 735 and act as a spring detent, thereby exerting an increased initial force retaining the penetrator assembly 160 in the retracted position. When adequate force, such as a falling worker, is applied to the penetrator assembly 160 to transition the penetrator assembly 160 towards the extended position, the spring 732 can be further compressed so that the washers 734 pop out of the depressions 735. Once the washers 734 are disengaged from the depressions 735, the compression mechanism 332 can exert a reduced force resisting the transition from the retracted position to the extended position. The transition from the retracted position to the extended position is demonstrated below with respect to FIGS. 8-11.

Figure 8:
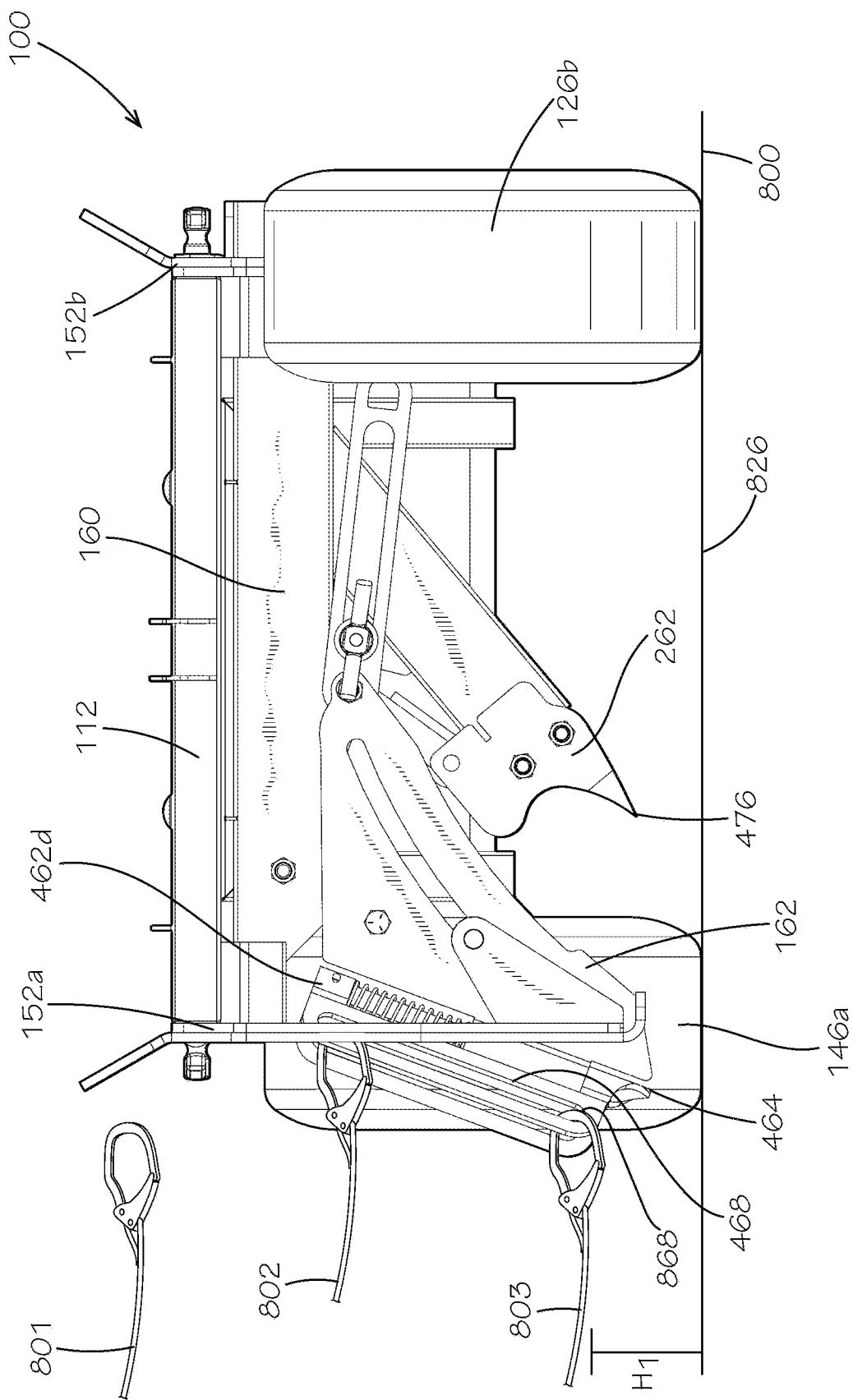
FIG. 8 is a front view of the fall arrest cart assembly of FIG. 1 positioned on a ground surface with the penetrator assembly in the retracted position.

FIG. 8 is a front view of the fall arrest cart assembly 100 of FIG. 1 positioned on a ground surface 800 with the penetrator assembly 160 in the retracted position. In the present view, one of the tires 126a has been hidden for clarity. The tires 126a,b,146a,b (tires 126a,146b shown in FIG. 1) can define a bottom plane 826 of the cart 110, which can be coplanar with the ground surface 800 in FIGS. 8-11, and the discussion of the physical relationship of components below with respect to the ground surface 800 can be equally applicable to the bottom plane 826. For example and without limitation, if the at least one inboard spike 476 penetrates the ground surface 800, the at least one inboard spike 476 can also penetrate, or extend through, the bottom plane 826.

In the retracted position, the at least one inboard spike 476 of the inboard penetrator 262 can be spaced above the ground surface 800 so that a gap is defined between the at least one inboard spike 476, and the at least one inboard spike 476 can be disengaged from the ground surface 800. Similarly, as represented by outboard spike assembly 462d, the outboard spikes 464 of the outboard spike assemblies 462a,b,c,d (outboard spike assemblies 462a,b,c shown in FIG. 4) of the outboard penetrator 162 can be spaced above the ground surface 800 so that a gap is defined between the outboard spikes 464, and the outboard spikes 464 can be disengaged from the ground surface 800. In other words, in the retracted position, the penetrator assembly 160 may not contact the ground surface 800.

Additionally, in the retracted position, the outboard spike assemblies 462a,b,c,d can be at least partially positioned beneath the frame 112 and between the front weight plate sets 152a,b and the rear weight plate sets 152c,d (shown in FIG. 1). In the present aspect, the secondary spikes 464 can be positioned outward form the frame 112 in the retracted position, so that the secondary spikes 464 may not be horizontally positioned below the frame 112 in the retracted position.

In use, the fall arrest cart assembly 100 can be positioned on the ground surface 800 with the outboard penetrator 162 facing a fall hazard, such as an unprotected ledge. A worker (not shown) can then take a lanyard 801 of his or her fall arrest harness and clip it into the lanyard slot 468 of one of the outboard spike assemblies 462a,b,c,d, as shown by the lanyard 801 in position 802. The lanyard slots 468 can be vertically elongated so that the worker does not have to bend over far to clip the lanyard 801 to the lanyard slot 468, as seen in position 802. Under the force of gravity, the lanyard will then fall to the bottom end 868 of the lanyard slot 468, as demonstrated by position 803. Due to the low position 803 of the lanyard 801 relative to the ground surface 800, if the worker falls, a load exerted by the lanyard 801 of the falling worker will be exerted on the fall arrest cart assembly 100 near the ground surface 800, as demonstrated in FIG. 9.

Additionally, as the penetrator assembly 160 transitions from the retracted position to the extended position, a height of the bottom end 868 above the ground surface 800 can reduce, as demonstrated by a height $H_1$ of the bottom end 868 above the ground surface 800 in the retracted position, a height $H_2$ (shown in FIG. 9) of the bottom end 868 above the ground surface 800 in a first intermediate position, a height $H_3$ (shown in FIG. 10) of the bottom end 868 above the ground surface 800 in a second intermediate position, and a height $H_4$ (shown in FIG. 11) of the bottom end 868 above the ground surface 800 in the extended position. As shown, the height $H_4$ can be less than the height $H_3$, which can be less than the height $H_2$, which can be less than the height $H_1$.

Figure 9:
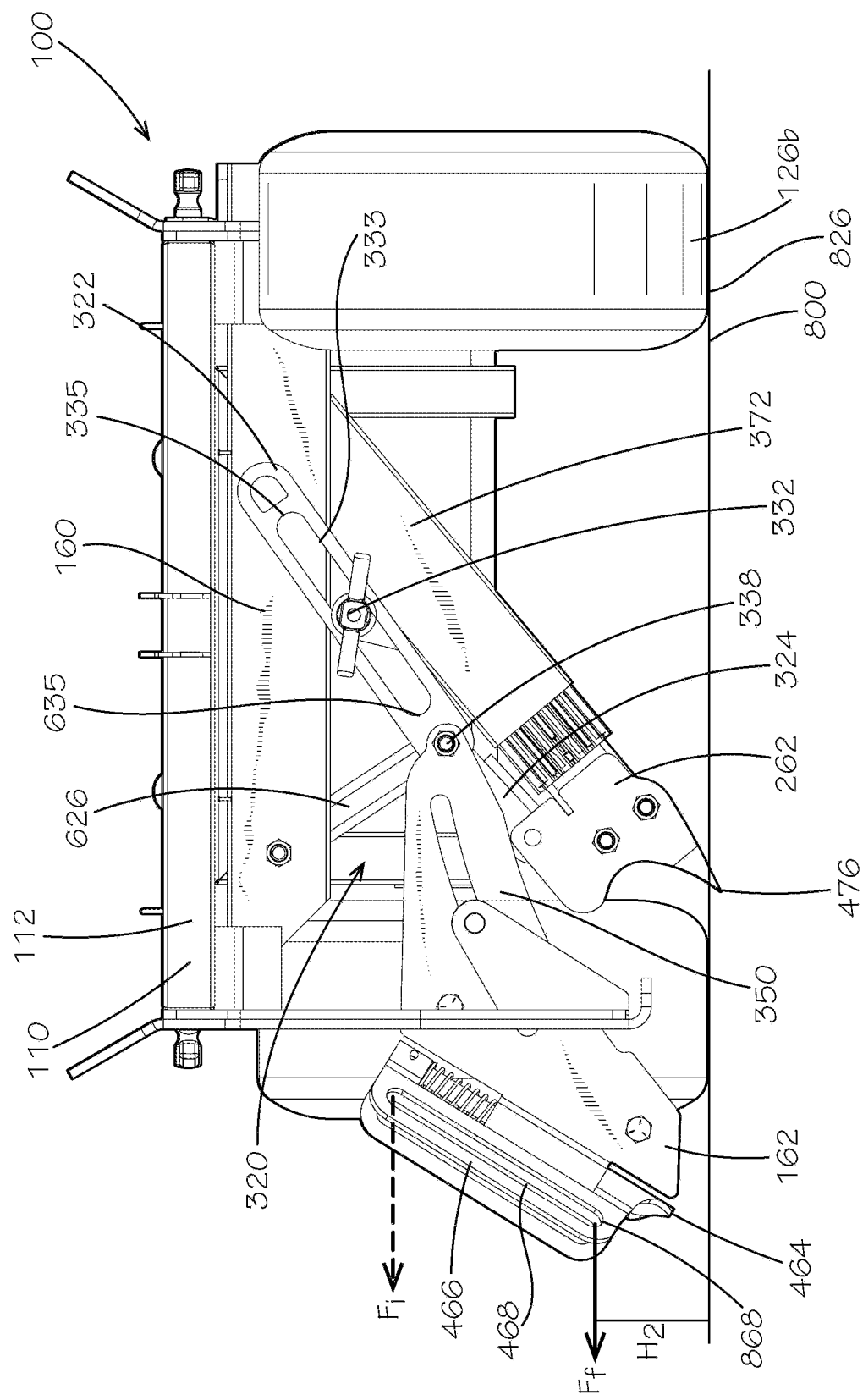
FIG. 9 is a front view of the fall arrest cart assembly of FIG. 1 positioned on the ground surface with the penetrator assembly in a first intermediate position.

FIG. 9 is a front view of the fall arrest cart assembly 100 of FIG. 1 positioned on the ground surface 800 with the penetrator assembly 160 in the first intermediate position. In the present view, one of the tires 126a has been hidden for clarity. In the position shown, an outward force has been exerted on the outboard penetrator 162 pulling the outboard penetrator 162 outward from the frame 112 of the cart 110. As described above with respect to FIG. 8, the force can come from the lanyard 801 (shown in FIG. 8) of a worker (not shown) that has fallen, such as over the edge of a building's roof, for example and without limitation.

Force arrow $F_i$ can demonstrate an initial force $F_i$ that can be applied if for some reason the lanyard 801 were positioned high in the lanyard slot 468, such as in position 802 (shown in FIG. 8). Because the lanyard slot 468 is sloped diagonally relative to the ground surface 800, the force from the lanyard 801 and the force of gravity will cooperate to guide the lanyard 801 downwards to the lower position 803 (shown in FIG. 8), where the lanyard can bottom out at the bottom end 868 of the lanyard slot 468. From the lower position 803, the lanyard 801 can exert the falling force, represented by force arrow $F_f$, against the lanyard loop 466.

The falling force $F_f$ can be an outward force acting in a direction pulling the outboard penetrator 162 away from the frame 112. The falling force $F_f$ can be transferred through the outboard frame 350 of the outboard penetrator 162 to the center pin 338 of the linkage 320, which can act on the retaining links 322 and the compression mechanism 332, which provide the detent effect, described above with respect to FIG. 7 that retains the penetrator assembly 160 in the retracted position. Once overcome, the penetrator assembly 160 can begin to transition towards the extended position, and the compression mechanism 332 can be positioned within the retaining slot 333 between the first end 635 and the second end 335 in the first intermediate position.

In the retracted position, the lower link 324 and the upper link 626 can be deeply angled relative to one another, such that they are orthogonally oriented or define an acute angle between them. As the falling force $F_f$ begins to pull the center pin 338 of the linkage 320 to the left, with respect to the present viewing angle, the lower link 324 and the upper link 626 can begin to straighten relative to one another towards an inline configuration. In doing so, the linkage 320 can drive the inboard penetrator 262 downwards and outwards from the inboard guide 372 until the at least one inboard spike 476 can begin to penetrate the ground surface 800. The linkage 320 can demonstrate significant leverage and mechanical advantage that can aid the inboard penetrator 262 in stabbing into hard ground surfaces 800.

In the first intermediate position, shown here, the inboard penetrator 262 can be in contact with the ground surface 800, but the outboard penetrator 162 and its outboard spikes 464 can remain spaced above the ground surface 800 so that there is no contact with the ground surface 800. However, as the falling force continues to act on the penetrator assembly 160, the penetrator assembly 160 can transition to a second intermediate position shown in FIG. 10.

Figure 10:
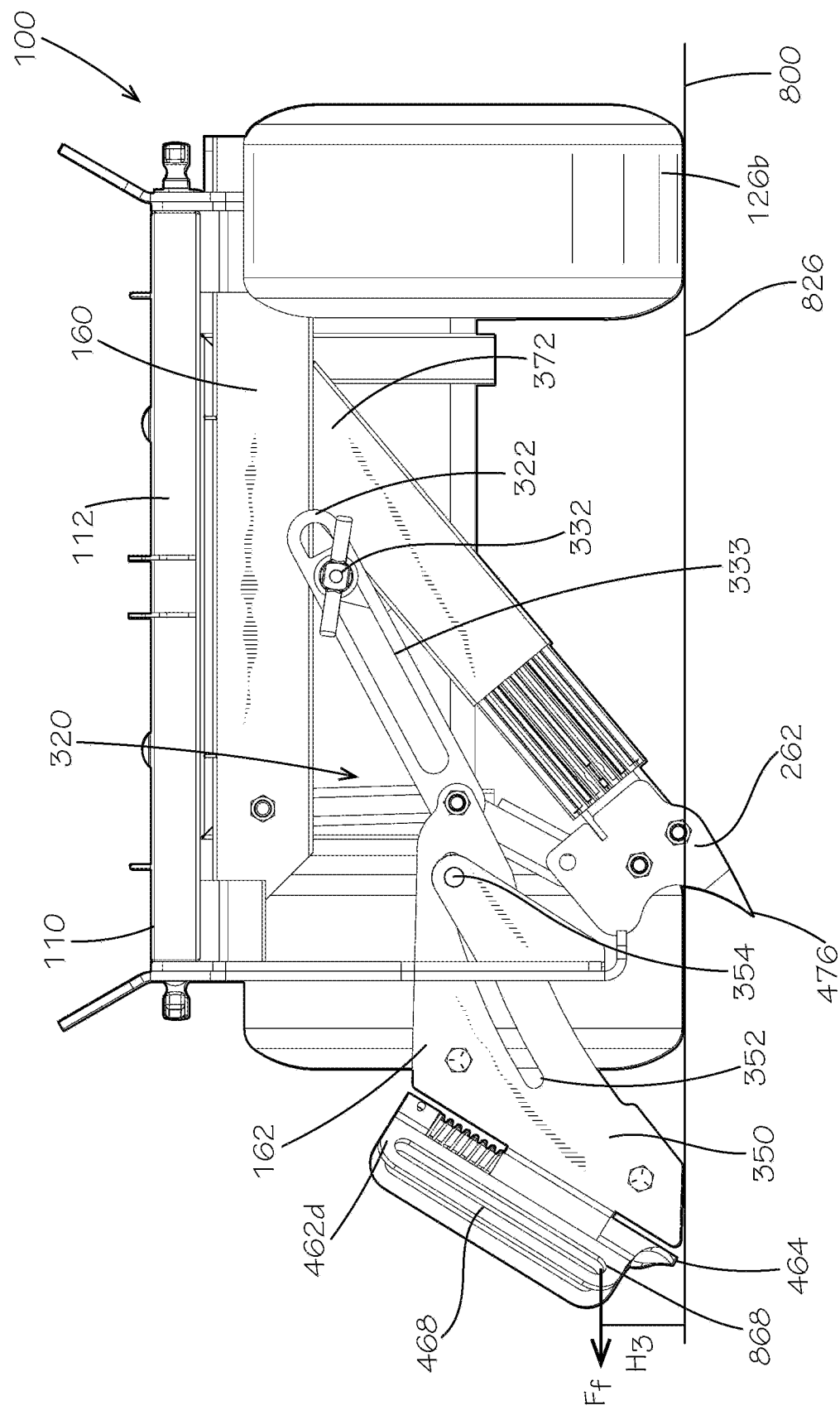
FIG. 10 is a front view of the fall arrest cart assembly of FIG. 1 positioned on the ground surface with the penetrator assembly in a second intermediate position.

FIG. 10 is a front view of the fall arrest cart assembly 100 of FIG. 1 positioned on the ground surface 800 with the penetrator assembly 160 in the second intermediate position. In the present view, one of the tires 126a has been hidden for clarity. In the second intermediate position, both the inboard penetrator 262 and the outboard penetrator 162 can be in contact with the ground surface 800, but only the at least one inboard spike 476 can engage and/or penetrate the ground surface 800. The outboard frame 350 of the outboard penetrator 162 can rest on the ground surface 800, but as demonstrated by the outboard spike assembly 462d, the at least one outboard spike 464 of the outboard penetrator 162 can remain spaced above the ground surface 800 so that the outboard spikes 464 are not engaged with the ground surface 800.

In the second intermediate position, the linkage 320 can prevent further movement of the inboard penetrator 262 and the outboard frame 350 of the outboard penetrator 162 relative to the frame 112 of the cart 110. First, the compression mechanism 332 can be bottomed out at the second end 335 (shown in FIG. 3) of the restraining slot 333 of the retaining links 322, thereby resisting the falling force $F_f$ acting on the bottom end 868 of the lanyard slot 468. Additionally, the guide pin 354 can be bottomed out at the second end 358 (shown in FIG. 3) of the guide slot 352, thereby providing further resistance against the falling force $F_f$.

Additionally, in the second intermediate position, the inboard penetrator 262 can be fully telescoped outwards from the inboard guide 372, and the at least one inboard spike 476 can fully penetrate the ground surface 800 so that the at least one inboard spike 476, and therefore the inboard penetrator 262, can be at least partially positioned beneath the ground surface 800.

Figure 11:
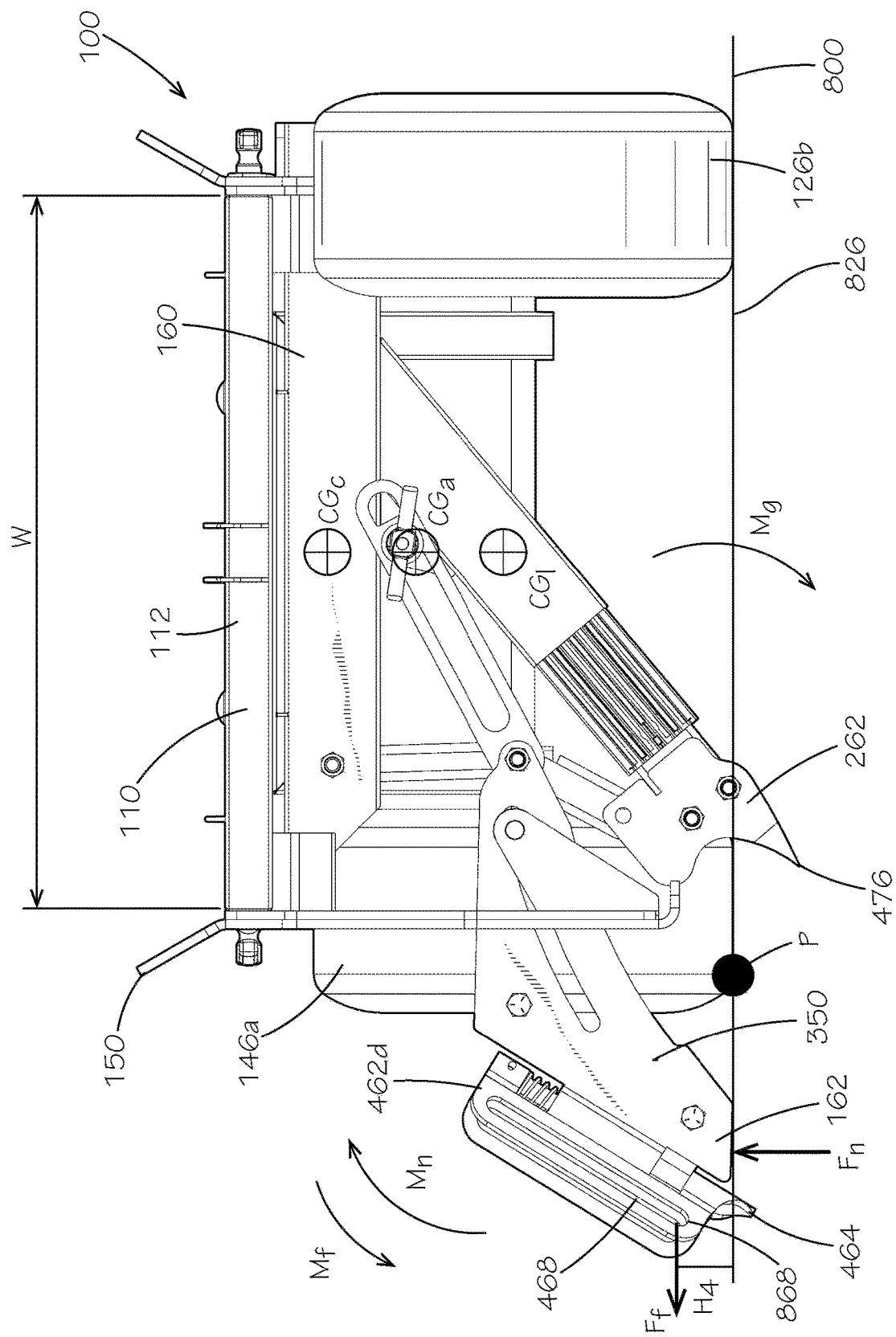
FIG. 11 is a front view of the fall arrest cart assembly of FIG. 1 positioned on the ground surface with the penetrator assembly in the extended position.

FIG. 11 is a front view of the fall arrest cart assembly 100 of FIG. 1 positioned on the ground surface 800 with the penetrator assembly 160 in the extended position. In the extended position, the at least one inboard spike 476 of the inboard penetrator 262 can be fully engaged with and penetrating the ground surface 800 below the frame 112, and at least one outboard spike 464 of the outboard penetrator 162 can engage and penetrate the ground surface 800 horizontally outward from the frame 112, as demonstrated by the outboard spike assembly 462d. In the present aspect, the inboard penetrator 262 can engage the ground surface 800 directly below the frame 112 so that the at least one inboard spike 476 can be horizontally positioned within the width W (extending between the side rails 118a,b as shown in FIG. 1) of the frame 112. The at least one outboard spike 464 can engage and penetrate the ground surface 800 outward from the frame 112 so that the at least one outboard spike 464 can contact the ground surface 800 at a location horizontally positioned outside the width W of the frame 112. When the spikes 464,476 penetrate the ground surface 800, the spikes 464,476 can be at least partially positioned below the ground surface 800.

In addition to friction between the tires 126a,b,146a,b (tires 126a and 146b shown in FIG. 1) and the ground surface 800, the penetrators 162,262 can resist the force $F_f$ and prevent the fall arrest cart assembly 100 from sliding laterally in the direction of the force $F_f$, thereby stopping the worker's fall.

With respect to overturning the fall arrest cart assembly 100, the tires 126a,146a (tire 126a shown in FIG. 1) can act as a pivot point P for overturning the fall arrest cart assembly 100, and the force $F_f$ can exert an overturn moment $M_f$ about pivot point P biasing the fall arrest cart assembly 100 to flip on its side in the direction of the falling force $F_f$. A magnitude of the overturn moment $M_f$ can be reduced by the minimal height $H_4$, which can have the effect of minimizing a moment arm of the overturn moment $M_f$ about the pivot point P.

In addition to the reduced height $H_4$ reducing the risk of overturn, the outboard penetrator 162 can act as an outrigger, similar to that of a mobile crane, which can resist the overturn moment $M_f$. As shown, the ground surface 800 can exert a normal force $F_n$ on the outboard spike 464 and the outboard frame 350 of the outboard penetrator 162. The normal force $F_n$ can produce a normal moment $M_n$ acting about the pivot point P to resist the overturn moment $M_f$. Additionally, the weight of the fall arrest cart assembly 100 can act to produce a gravitational moment $M_g$ about the pivot point P, which can also act to resist the overturn moment $M_f$.

The stability of the fall arrest cart assembly 100 can be enhanced by having a low center of gravity $CG_a$ for the fall arrest cart assembly 100. The cart 110 can define a cart center of gravity $CG_c$, which can be positioned slightly beneath the frame 112 of the cart 110, in part on account of the weight of the tires 126a,b,146a,b and axle assemblies 120,140 (shown in FIG. 1). As discussed above, the load 150 can hang down below the frame 112 of the cart 110 so that a load center of gravity $CG_l$ of the load 150 can be positioned below both the frame 112 and below the cart center of gravity $CG_c$. Because the load center of gravity $CG_l$ can be positioned beneath the cart center of gravity $CG_c$, an assembly center of gravity $CG_a$ of the overall fall arrest cart assembly 100 can be lower than the cart center of gravity $CG_c$. The penetrator assembly 160 being positioned beneath the frame 112 can also aid in lowering the assembly center of gravity $CG_a$ of the overall fall arrest cart assembly 100. The lower assembly center of gravity $CG_a$ can provide greater stability to resist overturning than if the assembly center of gravity $CG_a$ were positioned higher, such as if the load 150 were placed atop the frame 112, for example and without limitation.

In other aspects, the load 150 can be distributed with a great percentage of its weight mounted along the second side rail 118b (shown in FIG. 1), on the opposite side from the outboard penetrator 162. This arrangement can not only offer a low load center of gravity $CG_l$, but it can also shift the load center of gravity $CG_l$, away from the outboard penetrator 162, thereby increasing a moment arm of the load center of gravity $CG_l$ acting about the pivot point P and increasing a magnitude of the gravitational moment $M_g$ without increasing an overall weight of the fall arrest cart assembly 100.

Because the force $F_f$ can neither laterally move nor overturn the fall arrest cart assembly 100, if a worker falls over a ledge with his lanyard connected to the lanyard slot 468, the fall arrest cart assembly 100 can hold its position to arrest the worker's fall.

Figure 12:
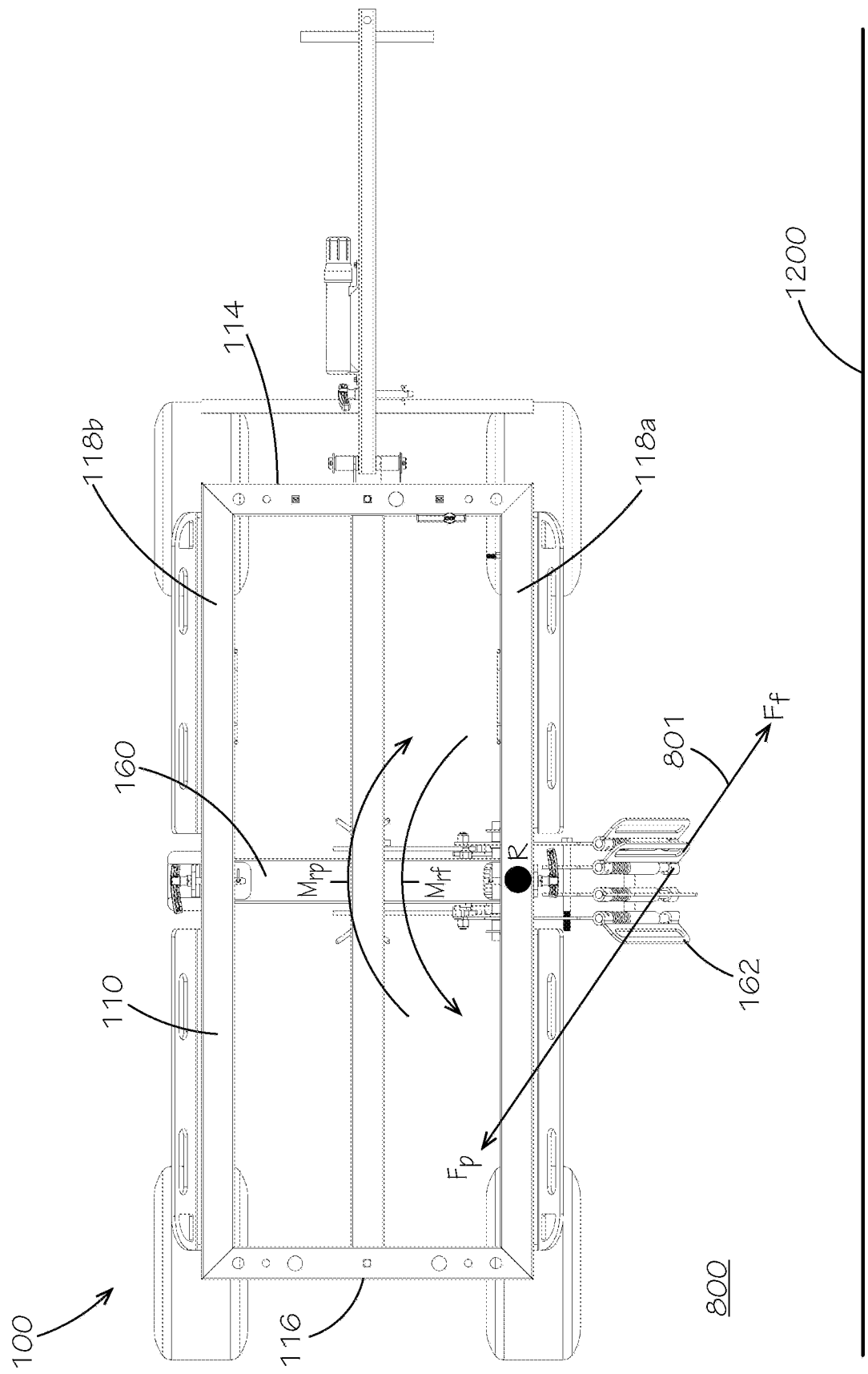
FIG. 12 is a top view of the fall arrest cart assembly of FIG. 1 with the penetrator assembly in the extended position and engaging the ground surface.

FIG. 12 is a top view of the fall arrest cart assembly 100 of FIG. 1 with the penetrator assembly 160 in the extended position and engaging the ground surface 800. The penetrator assembly 160 is shown facing a ledge 1200 of the ground surface 800.

At times, the falling force $F_f$ may not act in a direction that is perpendicular to the side rails 118a,b because the falling force $F_f$ can be exerted on the penetrator assembly 160 by the lanyard 801 from wherever a worker (not shown) may fall over the ledge 1200. As shown, the falling force $F_f$ can act in a direction that can be diagonal to the side rails 118a,b, such as if the worker falls over the ledge 1220 towards the front end 114 or the rear end 116 of the cart 110. Contact between the inboard penetrator 262 (shown in FIG. 2) and the ground surface 800 can create a rotational point R for the fall arrest cart assembly 100. The falling force $F_f$ acting diagonally on the outboard penetrator 162 can produce a falling force rotational moment $M_{rf}$ acting about the rotational point R, which attempts to rotate the fall arrest cart assembly 100 on the ground surface 800. However, engagement between one or more of the outboard spikes 464 (shown in FIG. 4) of the outboard penetrator 162 with the ground surface 800 can allow the outboard penetrator 162 to produce a penetrator force $F_p$ that can counter the falling force $F_f$ in both direction and magnitude. The penetrator force $F_p$ can produce a penetrator rotational moment $M_{rp}$, which can resist the falling force rotational moment $M_{rf}$ and prevent the fall arrest cart assembly 100 from rotating on the ground surface 800. Additionally, as discussed in greater detail below with respect to FIGS. 13-15, each of the outboard spikes 464 can be rotatable to align with the angle of the lanyard 801 between the fall location of the worker at the ledge 1200 and the cart 110.

Figure 13:
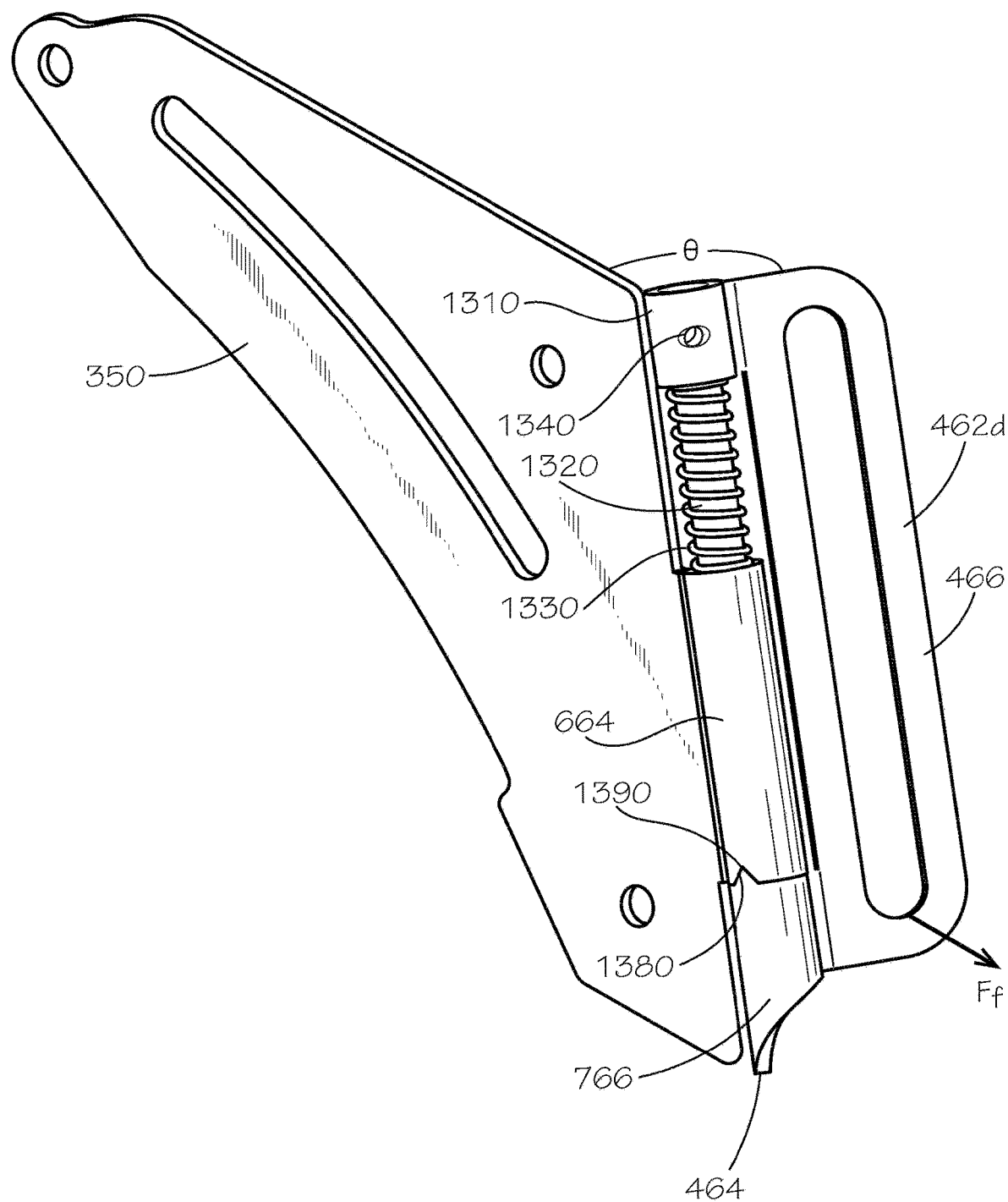
FIG. 13 is a perspective side view of a frame and an outboard spike assembly of the outboard penetrator of FIG. 3.
Figure 14:
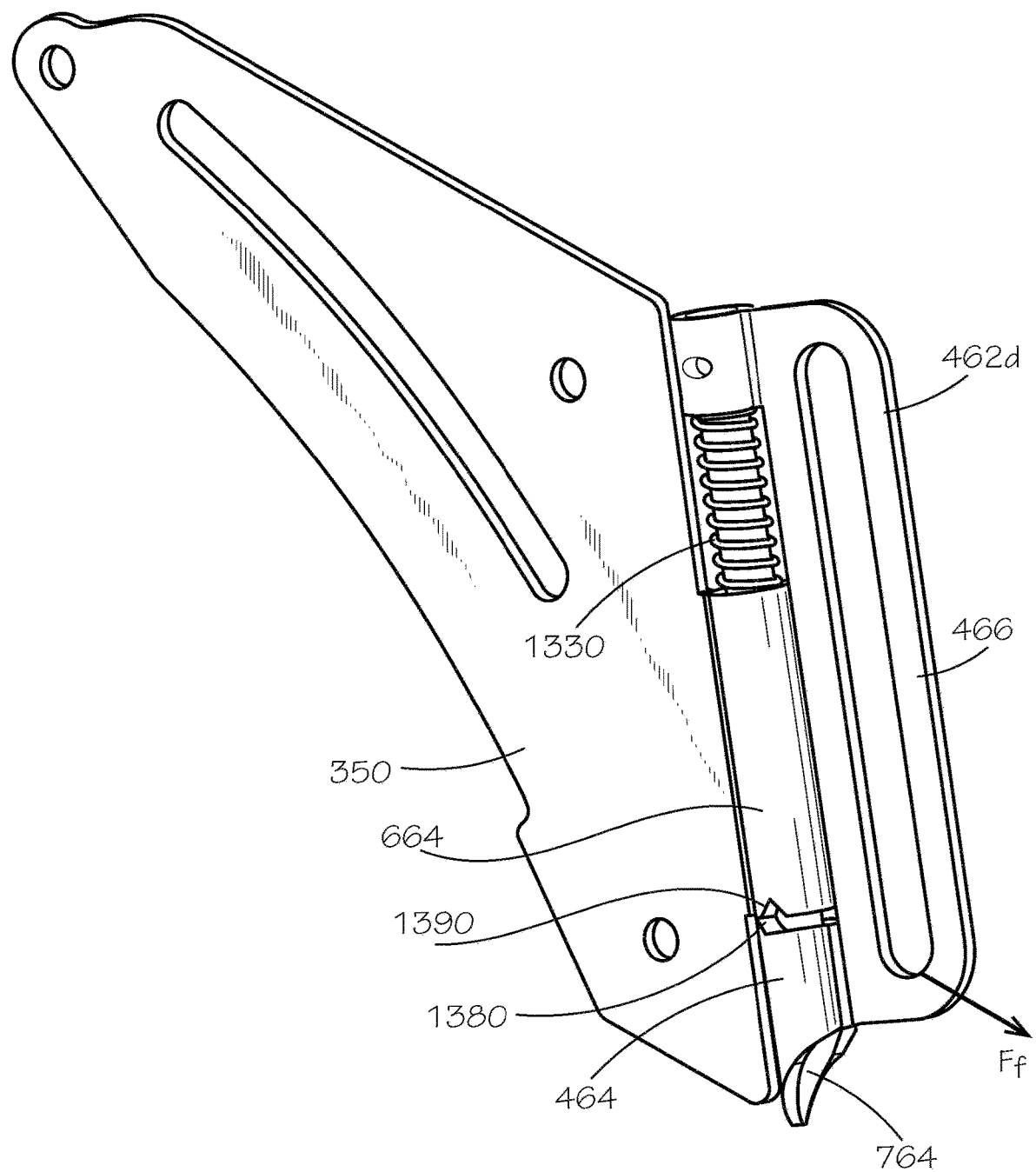
FIG. 14 is a perspective side view of the frame and the outboard spike assembly of the outboard penetrator of FIG. 3.
Figure 15:
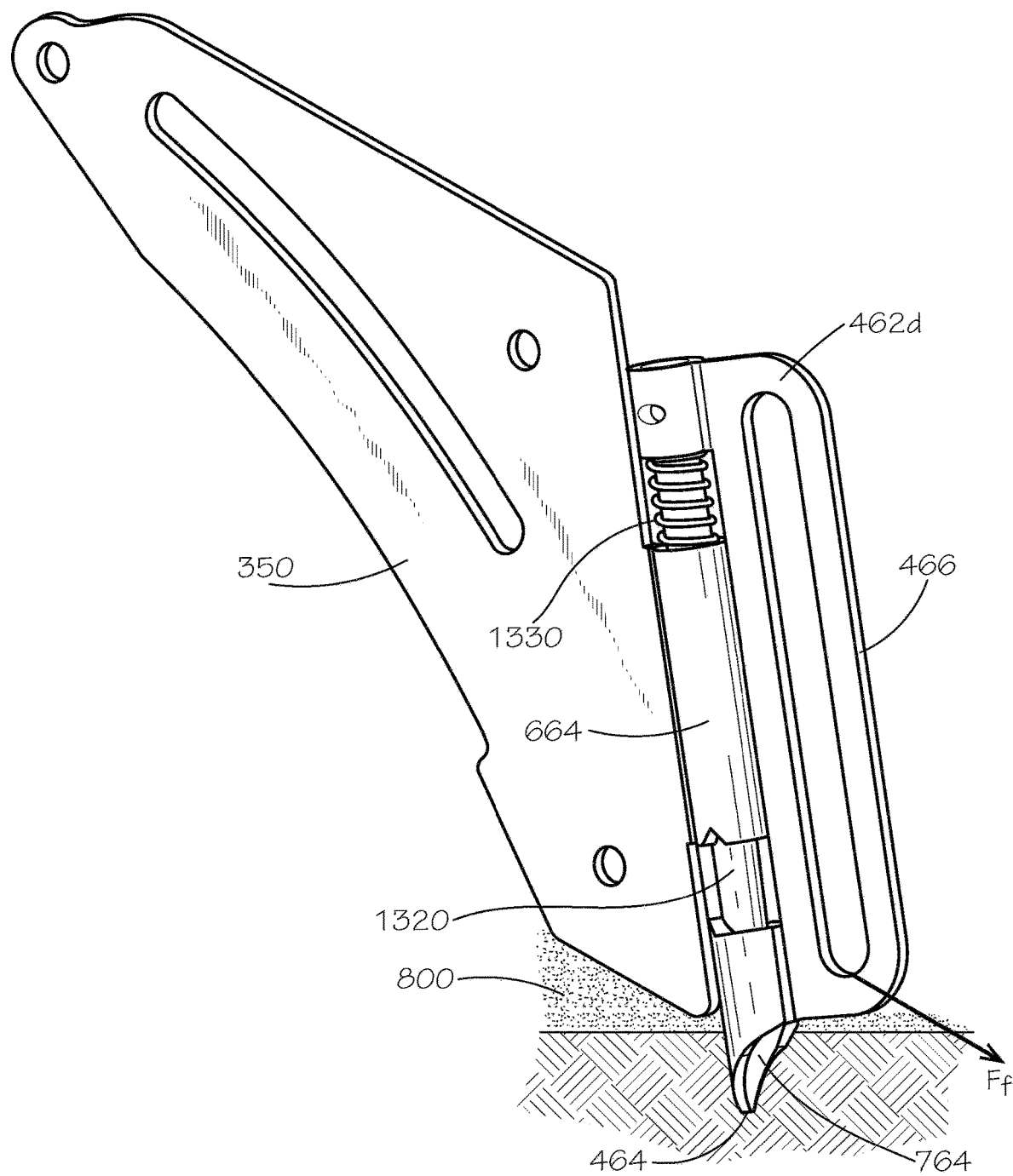
FIG. 15 is a perspective side view of the frame and the outboard spike assembly of the outboard penetrator of FIG. 3 engaging the ground surface.

FIGS. 13-15 demonstrate the ability of each outboard spike assembly 462a,b,c,d to adapt to the direction of the falling force $F_f$ exerted by the lanyard 801 (shown in FIG. 8) in order to better counter the falling force $F_f$. FIG. 13 is a side perspective view of a portion of the outboard frame 350 and the outboard spike assembly 462d, with the outboard spike assembly 462d shown in a default position. In the present aspect, each outboard spike assembly 462a,b,c,d can remain in the default position in the retracted position, shown in FIG. 8, the first intermediate position, shown in FIG. 9, and the second intermediate position, shown in FIG. 10.

The outboard spike 464 can be directly coupled to the lanyard loop 466, such as being integrally formed, welded, or fastened together, for example and without limitation. Opposite from the outboard spike 464, the lanyard loop 466 can be directly coupled to a rod collar 1310. The rod collar 1310 can receive a rod 1320, which can extend between the rod collar 1310 and the outboard spike 464 and through the spike guide 664. The rod 1320 can be secured to the rod collar 1310 with a fastener 1340, such as a screw, a roll pin, a rivet, or any other suitable fastener. A spring 1330 can be captured on the rod 1320 between the rod collar 1310 and the spike guide 664, and the spring 1330 can bias the outboard spike 464 away from the extended position shown in FIGS. 11 and 15 and towards the default position shown, here, in FIG. 13.

In the default position, the outboard spike 464 can contact the spike guide 664. The outboard spike 464 can define an indexing tab 1380, and the spike guide 664 can define an indexing notch 1390. In other aspects, the arrangement can be reversed, and the spike guide 664 can define the indexing tab 1380, and the outboard spike 464 can define the indexing tab 1380. In either arrangement, the indexing notch 1390 can receive the indexing tab 1380 to rotationally index the outboard spike 464 and the lanyard loop 466 relative to the outboard frame 350 in the default position. In the aspect shown, the indexing tab 1380 and the indexing notch 1390 can each define a triangular shape. In other aspects, the indexing tab 1380 and/or the indexing notch 1390 can define a different shape, such as a rounded camming shape, for example and without limitation.

Referring to both FIG. 4 and FIG. 13, the outboard spike assembly 462d can be one of the outer outboard spike assemblies 462a,d, which can be positioned with the lanyard loop 466 angled relative to the outboard frame 350. An angle θ can be defined between the outboard frame 350 and the lanyard loop 466. In the present aspect, the angle θ can be approximately 135 degrees in the default position for the outer outboard spike assemblies 462a,d. The center outboard spike assemblies 462b,c, can be positioned with the lanyard loops 466 substantially aligned with the outboard frame 350, such that the angle θ between the outboard frame 350 and lanyard loops 466 can be 180 degrees. These configurations should not be viewed as limiting, and any of the outboard spike assemblies 462a,b,c,d can be aligned or angled at any angle with respect to the outboard frame 350. Preferably, the angle θ can be between 90 and 270 degrees.

Referring to both FIG. 7 and FIGS. 13-15, each outboard spike 464 can define a front profile 764 (shown in FIGS. 7, 14, and 15) and a side profile 766 (shown in FIGS. 7 and 13). As demonstrated by outboard spike assembly 462d, the front profile 764 can be rotationally aligned with the lanyard loop 466 so that the front profile 764 can face in whatever direction the lanyard loop 466 faces. In the present aspect, the front profile 764 can define an at least partially concave surface, similar to a shovel or scoop. In the present aspect, the at least partially concave surface can be at least partially cylindrically shaped.

At a 90-degree rotational offset, the outboard spike 464 can define a side profile 766 as demonstrated by the outboard spike assembly 462a. In the present aspect, the side profile 766 can define an at least partially convex surface. In the present aspect, the at least partially convex surface can be at least partially cylindrically shaped. As shown, the front profile 764 can be broader in shape and size than the side profile 766.

Returning to FIG. 13, the outboard spike 464 and the lanyard loop 466 can be rotatable relative to the spike guide 664, so that the lanyard loop 466, and the front profile 764, can turn to face and better resist the falling force $F_f$ from the lanyard 801 (shown in FIG. 8). Here, the falling force $F_f$ is shown being exerted in line with the outboard frame 350 and offset from the lanyard loop 466. The mechanics described below can be equally applicable wherein the lanyard loop 466 is aligned with the outboard frame 350, such as for center outboard spike assemblies 462b,c (shown in FIG. 4), and the falling force $F_f$ is exerted on the lanyard loop 466 diagonally offset from both the outboard frame 350 and the lanyard loop 466, as shown above in FIG. 12.

Turning to FIG. 14, as the falling force $F_f$ exerted by the lanyard 801 (shown in FIG. 8) acts on the lanyard loop 466, the lanyard loop 466 and the outboard spike 464 can rotate relative to the spike guide 664. The triangular shape and engagement between the indexing tab 1380 and the indexing notch 1390 can drive the outboard spike 464 downwards towards the extended position as the lanyard loop 466 and the outboard spike 464 turn relative to the spike guide 664, thereby partially compressing the spring 1330.

As referenced above, this rotation can bring the lanyard loop 466 and the front profile 764 in line with the falling force $F_f$, which provides the outboard spike 464 with a broader profile to engage more of the ground surface 800 when the outboard spike 464 penetrates into the ground surface 800, as shown in FIG. 15.

Turning to FIG. 15 and similarly discussed above with respect to FIGS. 10 and 11, the outboard frame 350 can rest upon the ground surface 800 in the second intermediate position (shown in FIG. 10) and the extended position (shown in FIG. 11 and FIG. 15). Because the spike guide 664 can limit the direction of travel of the outboard spike 464 through engagement with the rod 1320, as the falling force $F_f$ exerted by the lanyard 801 (shown in FIG. 8) continues to act on the lanyard loop 466, a portion of the force $F_f$ can be converted into a downward component that overcomes the spring 1330 and thrusts the outboard spike 464 into the ground surface 800 while the outboard frame 350 braces on the ground surface 800. The shovel or scoop shape of the front profile 764 can engage the ground surface 800 to act as an anchor between the outboard spike assembly 462d and the ground surface 800.

In the aspect discussed with respect to FIG. 13-15, the outboard spike assemblies 462a,b,c,d (outboard spike assemblies 462a,b,c shown in FIG. 4) can be individually actuated. For example, four different workers can connect lanyards 801 (shown in FIG. 8) to the four separate outboard spike assemblies 462a,b,c,d, and if one worker falls, only the outboard penetrator assembly 462 coupled to that worker's lanyard 801 will be actuated and placed in the extended position. By contrast, the inboard penetrator 262 (shown in FIG. 2) can be actuated and placed in the extended position if any of the four workers were to fall, thereby engaging all of the inboard spikes 476 (shown in FIG. 4) with the ground surface 800. In other aspects, the outboard spikes 464 of the different outboard spike assemblies 462a,b,c,d can be tied together, such as with a cross-link between outboard penetrator assemblies 462a,b,c,d. In such aspects, several or all of the outboard spike assemblies 462a,b,c,d can be actuated if a single worker falls.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fall arrest cart assembly comprising:
    a cart comprising a frame defining a front end and a rear end, the front end disposed opposite from the rear end, the frame comprising a first side rail and a second side rail extending between the front end and the rear end, the cart defining a bottom plane; and
    a penetrator assembly coupled to the cart, the penetrator assembly comprising an outboard penetrator comprising at least one outboard spike, the penetrator assembly movable between an extended position and a retracted position, the at least one outboard spike positioned outward from the first side rail and the second side rail in the extended position, the at least one outboard spike positioned at least partially below the bottom plane in the extended position; and wherein:
the outboard penetrator comprises an outboard frame, a first outboard spike of the at least one outboard spike, and a second outboard spike of the at least one outboard spike;
the first outboard spike is movable relative to the outboard frame; and
the second outboard spike is moveable relative to the outboard frame independently from the first outboard spike;
wherein: a spike guide is rigidly fixed to the outboard frame;
the first outboard spike is coupled to a rod; and the rod is received by the spike guide.

2. The fall arrest cart assembly of claim 1, wherein the at least one outboard spike is spaced above the bottom plane when the penetrator assembly is in the retracted position.

3. The fall arrest cart assembly of claim 1, wherein the first side rail is horizontally positioned between the outboard penetrator and the second side rail when the penetrator assembly is in the extended position.

4. The fall arrest cart assembly of claim 1, wherein the at least one outboard spike is rotatable relative to the cart to align with a direction of a falling force when the falling force is exerted on the at least one outboard spike.

5. The fall arrest cart assembly of claim 1, wherein:
the outboard frame rests on a ground surface when the cart is positioned on the ground surface with the outboard penetrator in the extended position; and
the at least one outboard spike is translatable relative to the outboard frame.

6. The fall arrest cart assembly of claim 1, wherein:
the penetrator assembly further comprises an inboard penetrator;
the inboard penetrator comprises at least one inboard spike; and
the at least one inboard spike is positioned between the first side rail and the second side rail when the penetrator assembly is in the retracted position.

7. The fall arrest cart assembly of claim 6, wherein the at least one inboard spike is positioned at least partially below the bottom plane when the penetrator assembly is in the extended position.

8. A fall arrest cart assembly comprising:
a cart comprising a frame, the cart defining a bottom plane;
a load coupled to the frame, the load comprising a plurality of weight plates, the load defining a load center of gravity, the load center of gravity positioned beneath the frame; and
a penetrator assembly coupled to the frame, the penetrator assembly movable between an extended position and a retracted position, the penetrator assembly comprising at least one spike, the at least one spike positioned at least partially below the bottom plane when the penetrator assembly is in the extended position;
wherein: the at least one spike is an at least one outboard spike of an outboard penetrator of the penetrator assembly; and the at least one outboard spike is positioned outward from the frame when the penetrator assembly is in the extended position;
wherein: the penetrator assembly further comprises an inboard penetrator comprising at least one inboard spike; and the at least one inboard spike is positioned beneath the frame and at least partially below the bottom plane when the penetrator assembly is in the extended position;
wherein the penetrator assembly comprises a linkage coupled to the inboard penetrator and the outboard penetrator, and wherein the linkage coordinates movement of the inboard penetrator and an outboard frame of the outboard penetrator between the retracted position and the extended position.

9. The fall arrest cart assembly of claim 8, wherein:
the penetrator assembly further comprises a lanyard loop defining a lanyard slot;
the penetrator assembly is transitionable from the retracted position to the extended position when a force acts on the lanyard loop; and
a bottom end of the lanyard loop is positioned below an assembly center of gravity of the fall arrest cart assembly.

10. The fall arrest cart assembly of claim 9, wherein:
a first height is defined between the bottom end and a ground surface when the cart is positioned on the ground surface with the penetrator assembly positioned in the retracted position;
a second height is defined between the bottom end and the ground surface when the cart is positioned on the ground surface with the penetrator assembly positioned in the extended position; and
the first height is greater than the second height.

11. The fall arrest cart assembly of claim 8, wherein:
the cart defines a cart center of gravity; and
the load center of gravity is positioned below the cart center of gravity.

12. The fall arrest cart assembly of claim 1, wherein a spring is captured on the rod, and wherein the spring biases the first outboard spike away from the extended position.

13. The fall arrest cart assembly of claim 1, wherein a lanyard loop is coupled to the first outboard spike.

14. The fall arrest cart assembly of claim 1, wherein:
the first outboard spike defines an indexing tab;
the spike guide defines an indexing notch; and
the indexing notch receives the indexing tab when the penetrator assembly is in the retracted position.

* * * * *